United States Patent
Abatzoglou

(10) Patent No.: US 12,541,015 B2
(45) Date of Patent: Feb. 3, 2026

(54) METHODS AND SYSTEMS FOR PROCESSING RADAR SIGNALS TO DETERMINE RELATIVE POSITION AND MOTION OF NEARBY OBJECTS

(71) Applicant: Deere & Company, Moline, IL (US)

(72) Inventor: Theagenis J. Abatzoglou, Dana Point, CA (US)

(73) Assignee: Deer & Company, Moline, IL (US)

( * ) Notice: Subject to any disclaimer, the term of this patent is extended or adjusted under 35 U.S.C. 154(b) by 1178 days.

(21) Appl. No.: 17/474,902

(22) Filed: Sep. 14, 2021

(65) Prior Publication Data
US 2025/0138175 A1 May 1, 2025

(51) Int. Cl.
*G01S 13/06* (2006.01)
*G01S 13/58* (2006.01)

(52) U.S. Cl.
CPC ............ *G01S 13/06* (2013.01); *G01S 13/582* (2013.01)

(58) Field of Classification Search
CPC ................................. G01S 13/06; G01S 13/582
See application file for complete search history.

(56) References Cited

U.S. PATENT DOCUMENTS

| | | | |
|---|---|---|---|
| 7,969,345 B2 | 6/2011 | Abatzoglou et al. | |
| 2004/0130480 A1 | 7/2004 | Hellsten | |
| 2005/0062642 A1* | 3/2005 | Aker | G01S 13/52 342/115 |
| 2010/0259442 A1* | 10/2010 | Abatzoglou | G01S 13/282 342/25 A |
| 2020/0158861 A1* | 5/2020 | Cattle | G01S 13/9029 |

FOREIGN PATENT DOCUMENTS

| | | |
|---|---|---|
| JP | 4860816 B2 | 1/2012 |
| WO | 2020/161703 A2 | 8/2020 |
| WO | 2023/043818 A2 | 3/2023 |

OTHER PUBLICATIONS

International Search Report and Written Opinion for International Application No. PCT/US22/43498, mailed on Apr. 14, 2023, 10 pages.

(Continued)

*Primary Examiner* — Vladimir Magloire
*Assistant Examiner* — Ashley Brown Raynal
(74) *Attorney, Agent, or Firm* — Gary L. Montle; Lucian Wayne Beavers; Patterson Intellectual Property Law, PC

(57) ABSTRACT

A system processes radar signals to determine the relative position and motion of nearby objects. By directly processing a radar signal to estimate the range, velocity, and acceleration of an object, the system can more quickly and accurately determine the acceleration of an object. More precisely, the system may first process samples of a radar signal reflected from an object using a Fourier transform. Then, by using a coarse search method, the system can process the processed samples to quickly generate an initial estimate of an object's position and motion. Then, by using an iterative optimization method, the system can refine the initial estimate of the object's position and motion to generate a final estimate of an object's position and motion.

11 Claims, 14 Drawing Sheets

(56) References Cited

OTHER PUBLICATIONS

Abatzoglou, "A Fast Maximum Likelihood Algorithm for Frequency Estimation of a Sinusoid Based on Newton's Method," IEEE Transactions on Acoustics, Speech, and Signal Processing, Feb. 1985, pp. 77-89, vol. ASSP-33, No. 1.

Won, "Doppler Frequency Estimation of Point Targets in the Single-Channel SAR Image by Linear Least Squares," www.mdpi.com/journal/remotesensing, 2018, pp. 1-17.

Dybedal, "Doppler Radar Speed Measurement Based on a 24 GHz Radar Sensor," Norwegian University of Science and Technology, Master of Science in Electronics, Jun. 2013, pp. i-135.

"Error Analysis and Methods for Estimating Errors in Position, Velocity, and Acceleration Data," Range Commanders Council, May 1971, pp. i-122, Document 153-71.

Abatzaglou, "Fast Maximum Likelihood Joint Estimation of Frequency and Frequency Rate," Nov. 1986, pp. 708-715, vol. AES-22, No. 6.

Bello, "Joint Estimation of Delay, Doppler, and Doppler Rate," IRE Transactions of Information Theory, Jul. 2021, pp. 330-341.

Deng, et al., "Joint Estimation of Motion Parameters Using Newton's Method," IEEE Transactions on Aerospace and Electronic Systems, Oct. 2015, pp. 3386-3398, vol. 51, No. 4.

Bjornson, et al., "Massive MIMO is a Reality—What is Next," Jun. 2019, pp. 1-20.

Rytel-Andrianik, "On the Ambiguity Function for Accelerating Target in FMCW Radar," Journal of Telecommunications and Information Technology, 2007, pp. 40-44.

Chernyak, "On the Concept of MIMO Radar," Moscow Aviation Institute, 2021, pp. 327-332.

"Radar Signals Tutorial II: The Ambiguity Function," Gator Engineering, pp. 1-38.

Abatzoglou, et al., "Range, Radial Velocity, and Acceleration MLE Using Radar LFM Pulse Train," IEEE Transactions on Aerospace and Electronic Systems, Oct. 1998, pp. 1070-1084, vol. 34, No. 4.

"SAR Algorithms," Gator Engineering, pp. 1-52.

Balzan, "Singal Processing and Optimisation of MIMO Radar," The University of Adelaide, Oct. 2011, pp. i-235.

Xin, et al., "The Target Vehicle Movement State Estimation Method with Radar Based on Kalman Filtering Algorithm," Proceedings of the 2nd International Symposium on Computer, Communication, Control and Automation, 2013, pp. 342-345.

Moo, et al., "Tracking of Moving Targets with MIMO Radar," Presentation to 2017 NATO Military Sensing Symposium, May 2017, pp. 1-15.

* cited by examiner

METHODS AND SYSTEMS FOR PROCESSING RADAR SIGNALS TO DETERMINE RELATIVE POSITION AND MOTION OF NEARBY OBJECTS

TECHNICAL FIELD

The present disclosure generally relates to radar signal processing, and more particularly, methods, systems, and non-transitory computer readable media for processing radar signals to determine the relative position and relative motion of nearby objects.

RELATED ART

Sensor systems that can be used to detect and monitor the environment are a key part of many modern-day technologies. In particular, sensor systems that are capable of monitoring an environment to detect the existence and location of objects in that environment are key to many advanced systems. A variety of technologies can be employed by a sensor system to detect objects in an environment. One such technology is radar, which has long be used for object detection. Especially for military applications, radar has long been used for long-range tracking, on the orders of several miles to several hundred miles, particularly for airborne objects. Radar uses radio waves to detect the relative location of objects, among other things. Radar can come in many forms, and for a variety of purposes, such as long range-radar antennas used to track planes in an airspace or to track objects in space.

One increasingly important use for radar is for detecting objects in a local environment—such as within several hundred meters—as opposed to the prior use of utilizing radar for more long-range tracking. Local object detection can be used for a variety of purposes, but may in particular be used by the driver-assistance features of modern cars to detect objects in the path of the car (e.g., other vehicles) and determine if a collision is likely. This information can then be used to activate collision avoidance systems, such as automatic emergency breaking (AEB). To determine if a collision is likely using the radar system, it is necessary to evaluate a detected object and determine if the position and motion (i.e., the derivatives of position with respect to time, such as velocity, acceleration, etc.) of the object have it approaching the car at an unsafe level (e.g., at a dangerous speed with a distance providing too low margin of time to react). Largely, this depends on the distance between the car and the detected object and the object's motion relative to the car. For the speeds and distances of modern day vehicles, the important parameters of an object's relative motion are the objects (relative) position, velocity, and acceleration. Higher order terms of an object's relative motion (e.g., its jerk) may be important in some situations, with smaller distances and higher speeds increasing the relative importance of higher order terms.

The most classic method of determining the relative motion of a detected object is using successive measures of the object's position to calculate its velocity and use the calculated velocity and last measured position to calculate the object's approach. Each measurement of the object's position takes a certain amount of time. This delay adversely affects the performance of the system particularly in many emergency breaking scenarios for which timing may be critical. This is compounded if acceleration is also calculated and used, since acceleration is calculated from successive velocity measurements and thus requires even more measurements of an object's position to obtain sufficient accuracy.

To partially resolve this issue, many modern day radar systems used by a vehicle for local object detection measure the velocity from the radar signal directly. This increases the speed at which an object's motion (e.g., velocity and acceleration) can be calculated and increases the accuracy of the values determined for the object's motion. However, while this approach can be adequate for many situations, direct measurement of velocity still requires acceleration to be calculated from successive velocity measurements. This increases the time taken to determine whether a detected object is on an unsafe approach and to take corrective action. Indirect measurement of acceleration from direct measurements of velocity also decreases the accuracy of the overall determination of the object's motion, since the uncertainty inherent in the velocity measurement compounds the uncertainty in the acceleration measurement. Moreover, in the presence of significant acceleration, the (directly obtained) velocity measurements may be distorted unless the acceleration is accounted for. However, since the velocity measurements are distorted, indirect measurement of acceleration is unreliable, requiring direct measurement of acceleration in order to obtain accurate motion information. Thus, better ways of processing radar signals from a vehicle sensor to determine the relative position and motion of nearby objects are greatly desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for processing radar signals to determine a relative position and motion (e.g., range, velocity, and acceleration relative to the radar system) of nearby objects. These systems may be useful across a wide-range of applications, particularly for real-time systems where quick reactions are needed. By processing a (reflection of a) radar signal to directly measure the acceleration of nearby objects, systems of the present disclosure can more quickly and accurately determine the acceleration of an object than conventional systems. This allows more rapid and accurate calculations of the objects future trajectory, which, in turn, allows more rapid and accurate decision-making with regards to whether action needs to be taken, e.g., to avoid a collision. This also overcomes shortcomings present in many modern-day radar systems which yield inaccurate velocity and acceleration estimates (obtained indirect from direct from velocity estimates) in the presence of significant uncompensated acceleration. Moreover, systems of the present disclosure are able to determine the acceleration of an object with an accuracy near the theoretical optimal bound.

More precisely, systems of the present disclosure may first process samples of a radar signal (reflected from an object) using a Fourier transform. Then, by using a coarse search method, the system can process the processed samples to quickly generate an initial estimate of an object's position and motion. Then, by using an iterative optimization method, the system can refine the initial estimate of the object's position and motion to generate a final estimate of an object's position and motion. This final estimate is ideally within a small percentage of the true value for the object's position and motion. The final estimate can then be used in further processing (e.g., of the samples of the radar signal for radar imaging) or for various decision-making.

Figure 1:
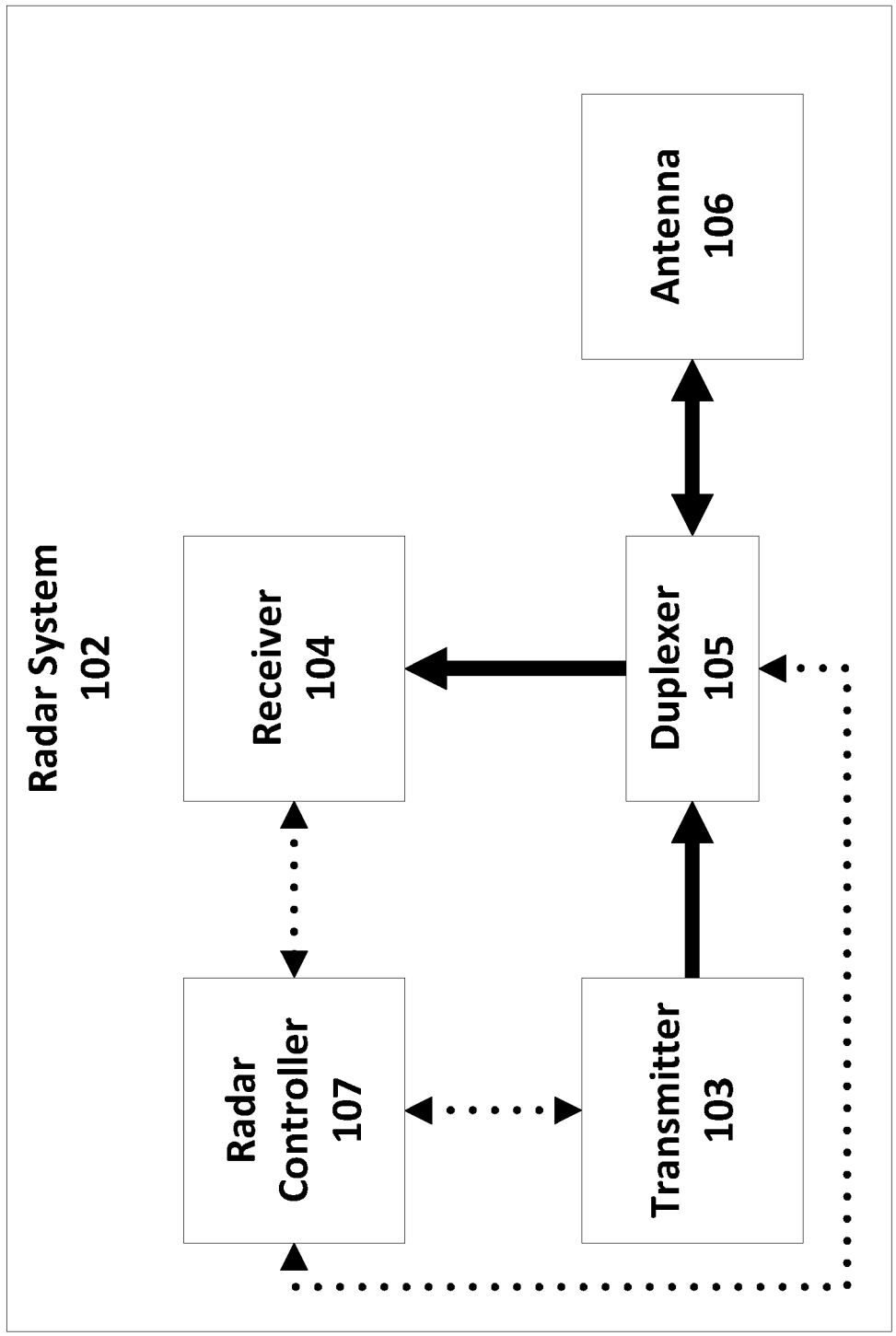
FIG. 1 is a block diagram of an exemplary radar system in accordance with an exemplary embodiment of the present disclosure.

FIG. 1 shows a block diagram of a radar system 102, in accordance with an exemplary embodiment of the present disclosure. As shown by the figure, the radar system 102 may comprise a transmitter 103, a receiver 104, a duplexer 105, and an antenna 106. The antenna 106 is shared between the transmitter 103 and the receiver 104, with both the transmitter 103 and the receiver 104 being connected to the antenna 106 through the duplexer 105. The radar system 102 also comprises a radar controller 107. The radar controller 107 may control the various components of the radar system 102 to orchestrate the functioning of the radar system. The radar controller 107 may also perform various signal processing for various purposes, such as to implement the method described in FIG. 6 below.

More precisely, the radar controller 107 is connected to the transmitter 103, the receiver 104, and the duplexer 105. The radar controller 107 may interact with the duplexer 105 to configure the duplexer 105 so that either the transmitter 103 or the receiver 104 is electrically connected to the antenna 106. The radar controller 107 may also interact with the transmitter 103 to cause the transmitter 103 to generate an electrical signal that causes the antenna 106 to emit a corresponding radar signal. Similarly, the radar controller 107 may interact with the receiver 104 to obtain measurements of a reflected radar signal by causing the receiver 104 to sample a reflected radar signal received by the antenna 106.

In operation, the radar system 102 works by having the transmitter 103 generate an electrical signal corresponding to a desired radar signal. Around the same time, the duplexer 105 is configured so that the transmitter 103 is connected to the antenna 106. The electrical signal from the transmitter 103 is then transmitted to the antenna 106 (through the duplexer 105), causing the antenna 106 to emit a corresponding radar signal in the form of a spherical wavefront. The emitted radar signal then traverses through the air until it encounters an object, which causes a portion of the radar signal to be reflected back towards the radar system 102 (in particular, towards the antenna 106). Meanwhile, around the time the antenna 106 has finished emitting the radar signal, the duplexer 105 is configured so that the receiver 104 is connected to the antenna 106. Eventually, the reflected portion of the radar signal reaches the antenna 106, which absorbs the reflected radar signal and generates a corresponding electrical signal. The receiver 104 then receives (through the duplexer 105) this signal and measures it, generating several samples of the received signal. This process can then be repeated.

The radar controller 107 may be implemented in hardware or a combination of hardware and software. As an example, the radar controller 107 may comprise one or more field programmable gate arrays (FPGAs) or one or more application-specific integrated circuits (ASICs). In some embodiments, the radar controller 107 may comprise one or more processors (e.g., central processing units (CPUs) or microprocessors) programmed with software that when executed by the processor cause it to perform the functions described herein for the radar controller 107. In other embodiments, other configurations of the radar controller 107 are possible.

Figure 2:
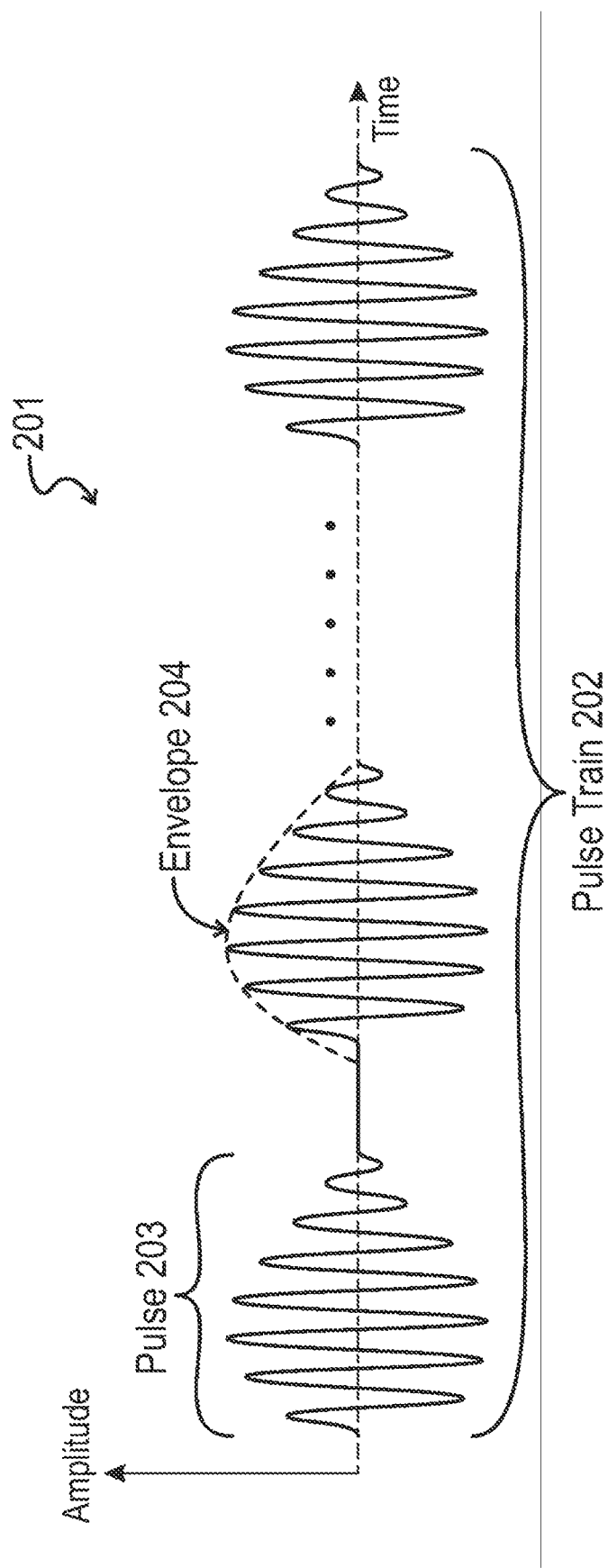
FIG. 2 is an illustration of an exemplary radar signal comprising a pulse train without linear frequency modulation (LFM) pulse waveforms.

FIG. 2 is an illustration of an exemplary radar signal generated by the transmitter 103 and broadcast by the antenna 106. As shown in the figure, the broadcast radar signal 202 is comprised of a plurality of pulses 203 (collectively called a pulse train). In some embodiments, the pulses 203 are evenly spaced, such that the distance between the start of one pulse and the start of the next pulse, called the inter-pulse period (IPP), is the same throughout the pulse train. As shown here, the frequency of each radar signal pulse is constant. In other embodiments variations in the IPP for a given pulse train are possible.

Figure 3:
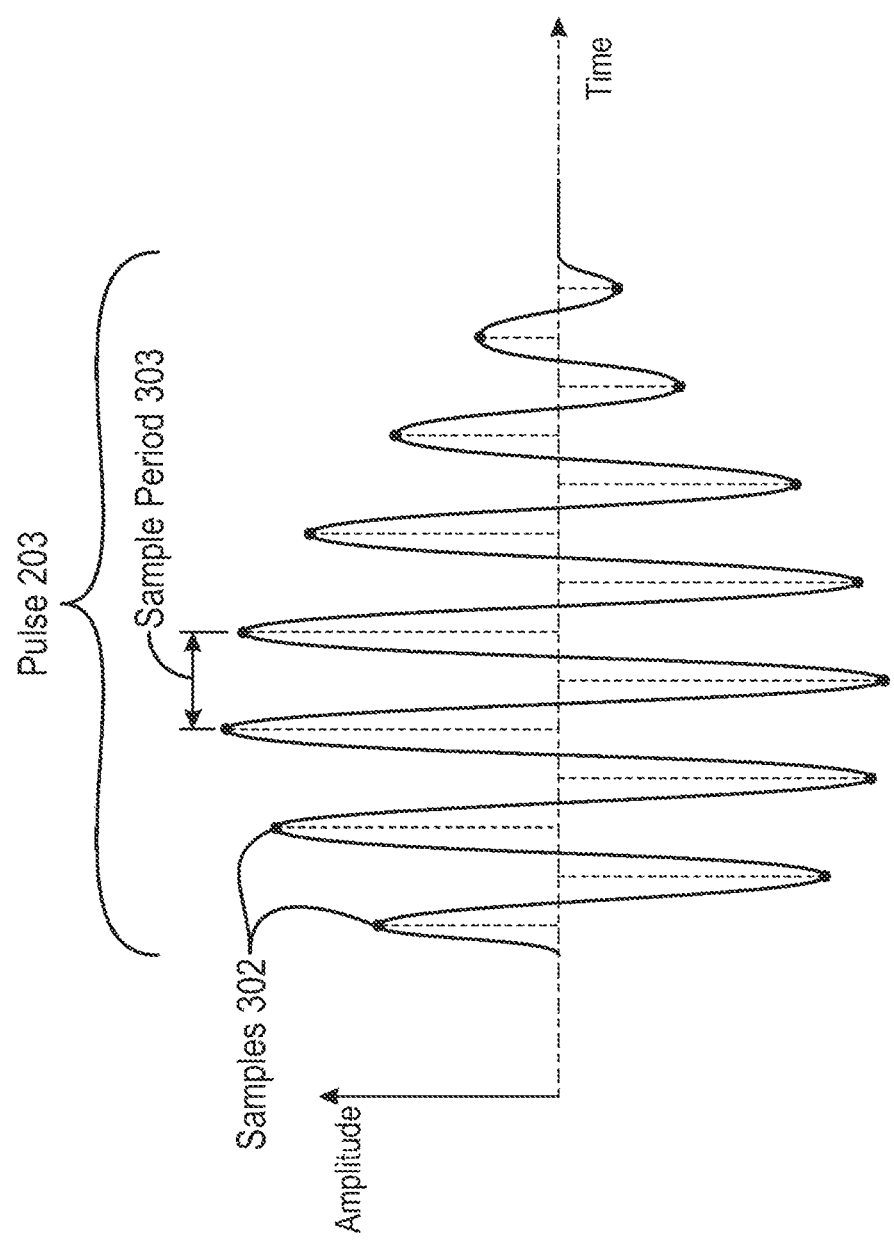
FIG. 3 is an illustration of an exemplary radar signal pulse, such as is depicted by FIG. 2, and its measurement.

FIG. 3 is an illustration of an exemplary radar signal pulse (e.g., radar signal pulse 202 of FIG. 2) and its measurement by the receiver 104. As shown in the figure, the radar signal pulse 203 is comprised of a radar signal whose amplitude varies at a constant frequency. When the radar signal pulse 203 is reflected from an object and received by the receiver 104, the receiver 104 measures the intensity (e.g., the amplitude) of the radar signal pulse 203 at various points to obtain the samples 302. These samples are typically taken at a constant rate, with the time between successive samples known as the sample period 303. As shown here, the frequency of the radar signal pulse may be constant.

Figure 4:
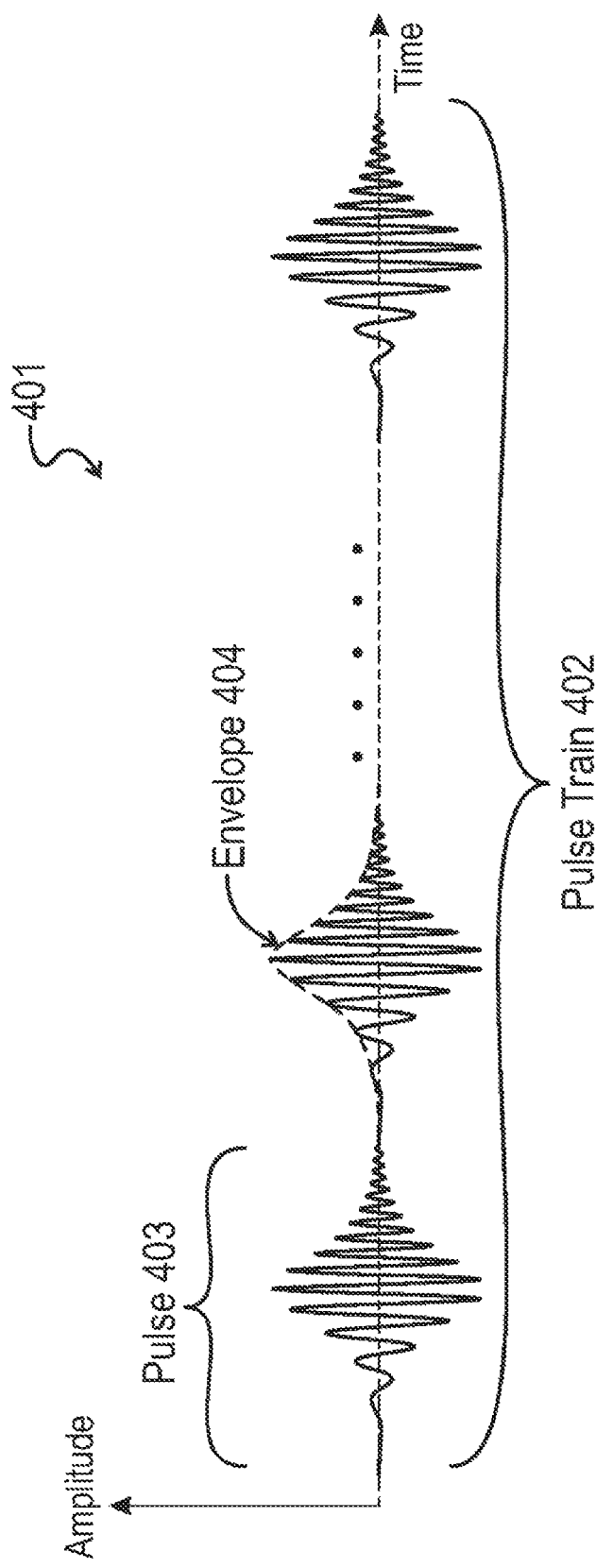
FIG. 4 is an illustration of an exemplary radar signal comprising a pulse train with linear frequency modulation (LFM) pulse waveforms.

FIG. 4 is an illustration of another exemplary radar signal generated by the transmitter 103 and broadcast by the antenna 106. As shown in the figure, the broadcast radar signal 402 is comprised of a plurality of pulses 403 (collectively called a pulse train). In some embodiments, the pulses 403 are evenly spaced, such that the distance between the start of one pulse and the start of the next pulse, called the inter-pulse period (IPP), is the same throughout the pulse train. Unlike the radar signal pulses 203 of FIG. 2, the frequency of each radar signal pulse 403 increases at a linear rate (known as the frequency sweep rate), starting at an initial frequency at the beginning of the pulse. This repeats (starting again the initial frequency) for the next radar signal pulse 403 of the radar signal 402.

Figure 5:
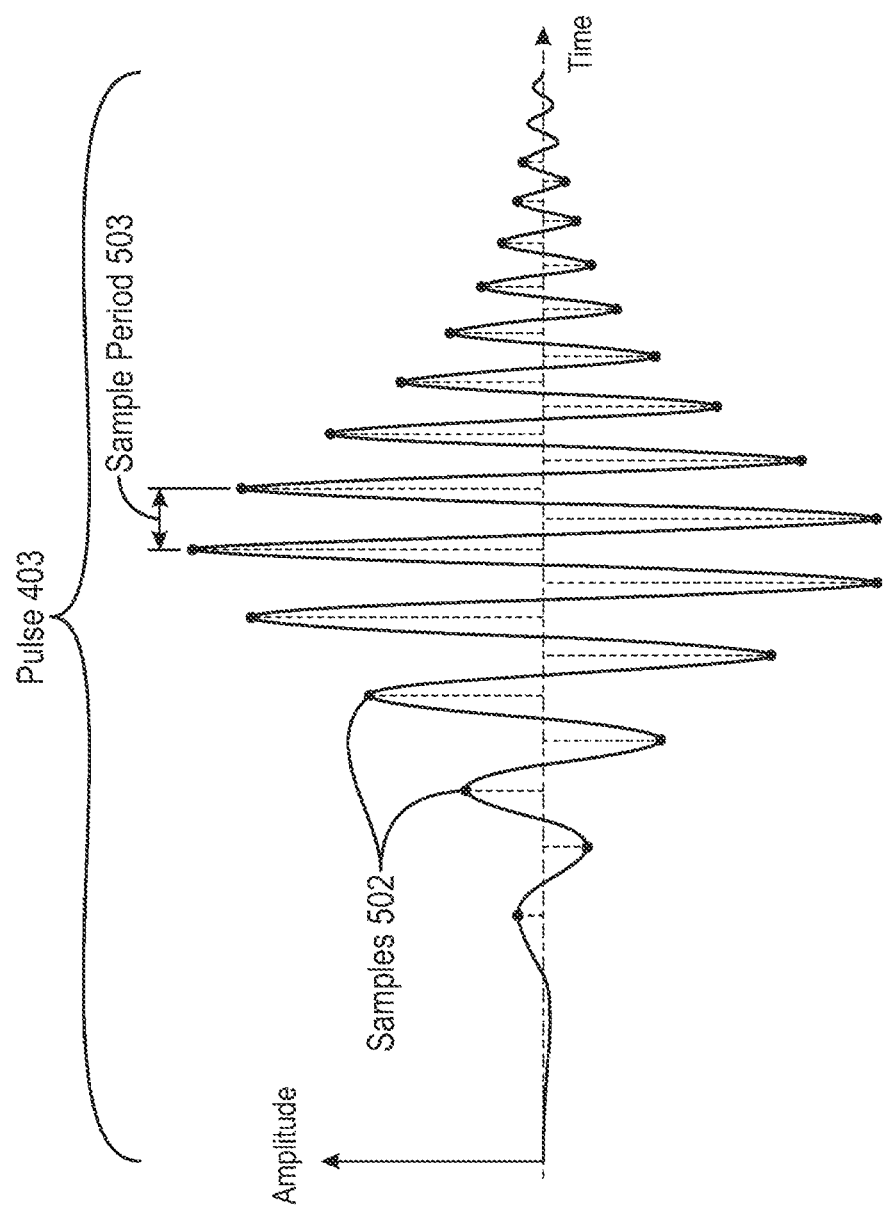
FIG. 5 is an illustration of an exemplary radar signal pulse, such as is depicted by FIG. 4, and its measurement.

FIG. 5 is an illustration of an exemplary radar signal pulse (e.g., radar signal pulse 202 of FIG. 2) and its measurement by the receiver 104. As shown in the figure, the radar signal pulse 203 is comprised of a radar signal whose amplitude varies at a constant frequency. When the radar signal pulse 203 is reflected from an object and received by the receiver 104, the receiver 104 measures the intensity (e.g., the amplitude) of the radar signal pulse 203 at various points to obtain the samples 302. These samples are typically taken at a constant rate, with the time between successive samples known as the sample period 303. Unlike the radar signal pulse 203 of FIG. 3, the frequency of the radar signal pulse 403 increases at a linear rate (known as the frequency sweep rate), starting at an initial frequency at the beginning of the pulse.

As previously mentioned, the use of radar systems to detect objects and measure their relative position and motion are important for numerous industrial applications, including for use by autonomous or semi-autonomous systems capable of moving through their environment. While such systems were, in past decades, largely confined to military applications involving aircraft, they are increasingly proliferating through a variety of industries in the modern era, as devices capable of autonomous navigation are increasingly deployed. These radar systems are often referred to as "imaging radar," since, given their higher spatial resolution, they are often capable of providing a significant amount of detail about objects within view of the radar system. Given this capability, radar systems are often employed where navigating through a potentially unknown environment are important. For example, robots capable of navigating warehouses are often equipped with one or more radar systems. Another significant modern-day application for radar systems is in vehicles equipped with driver-assistance features (and, seemingly in the near-future, vehicles capable of (in at least some situations) fully autonomous driving).

In simplistic terms, an autonomous system navigating through an environment utilizes various information including the following: where the objects in the environment are (i.e., the object's positions) and where the objects in the environment will be (i.e., the objects' trajectories). Determining where the objects are involves determining each object's range relative to the autonomous system and the angles of azimuth and elevation (relative to a coordinate system) for that range. Determining where the objects will be requires knowing each object's current position and knowing its motion parameters, i.e., how the object is currently moving. This includes the object's current velocity, but it also includes higher order terms, such as acceleration. In fact, there are, in a theoretical sense, a potentially infinite number of motion parameters for an object, one for each of the derivatives of position with respect to time (i.e., velocity, acceleration, jerk, etc.). In practice, however, for most objects and applications, only velocity and acceleration are meaningful. In other words, for most applications and radar systems, higher order motion parameters, such as jerk, have an effect that is at or below the accuracy of the system. The effect of these higher order motion parameters may grow to be meaningful in some applications, however, particularly for those involving extreme speeds (e.g., missiles) or extreme accuracy (e.g., millimeter level precision).

At a high level, there are two ways that the motion parameters of an object can be measured using a radar system: directly, from the effects of the motion parameters on the reflected signal, or indirectly, using successive measurements of the next lower order motion parameter (e.g., using successive measurements of range to calculate velocity). The benefit of measuring a motion parameter indirectly using successive measurements of the next lower order motion parameter is that these calculations are easy to calculate in terms of computational resources. A downside is that indirect measurements are significantly less accurate than direct measurements and require multiple measurements of the next lower order motion parameter, increasing the time needed to obtain a measurement of the desired motion parameter. These problems are compounded if multiple motion parameters are indirectly measured (e.g., velocity is indirectly calculated from successive measurements of range and acceleration is indirectly calculated from successive measurements of velocity).

Another downside to indirect measurement of motion parameters is that, depending on their magnitude, higher-order motion terms may distort the (direct) measurements of lower-order motion terms unless accounted for. To account for these higher-order motion terms, they must be determined (i.e., measured). However, in this case where the effect of the higher order motion terms is significant, indirect measurement is insufficient, since the lower-order motion terms are too distorted to yield sufficiently accurate estimates. Thus, if higher-order motion terms (e.g., acceleration) have a non-negligible magnitude, they must be directly measured in order to obtain an accurate estimate of both higher-order motion term and any of the lower-order motion terms.

To better explain, note that a higher order motion term (e.g., acceleration) is defined as the rate of change (per unit time) in the immediately preceding lower order motion term (e.g., velocity). If the higher order motion term is large enough, the lower order motion term's value may change significantly enough over the duration of the measurement so as to skew the resulting estimation. This effect is partially mediated by the signal-to-noise ratio (SNR) of the radar signals, with higher SNR making the system more robust (but not immune) to greater magnitudes of uncorrected for higher order motion terms. Lower SNR has the opposite effect. The effect is also mediated by the dwell time of the radar system, with shorter dwell times making systems more robust to greater magnitudes of uncorrected for higher order motion terms and longer dwell times having the opposite effect. However, longer dwell times also reduce the SNR of the radar signal, in addition to reducing the overall accuracy of the information derived from processing the radar signal, counteracting this effect.

For example, for a radar system attempting to directly estimate velocity and only indirectly measure acceleration, the velocity value directly estimated from the radar signal, for a given dwell time, becomes increasingly inaccurate as the magnitude of the acceleration increases. In particular, as the (uncompensated for) acceleration of the object increases, the radar signal becomes increasingly spread across the Doppler-resolution bins (which are what is used to estimate velocity (i.e., from the Doppler effect). Similarly, for the radar system, the velocity value directly estimated from the radar signal, for a given (uncompensated for) acceleration, becomes increasingly inaccurate as the length of the dwell time increases.

Figure 11A:
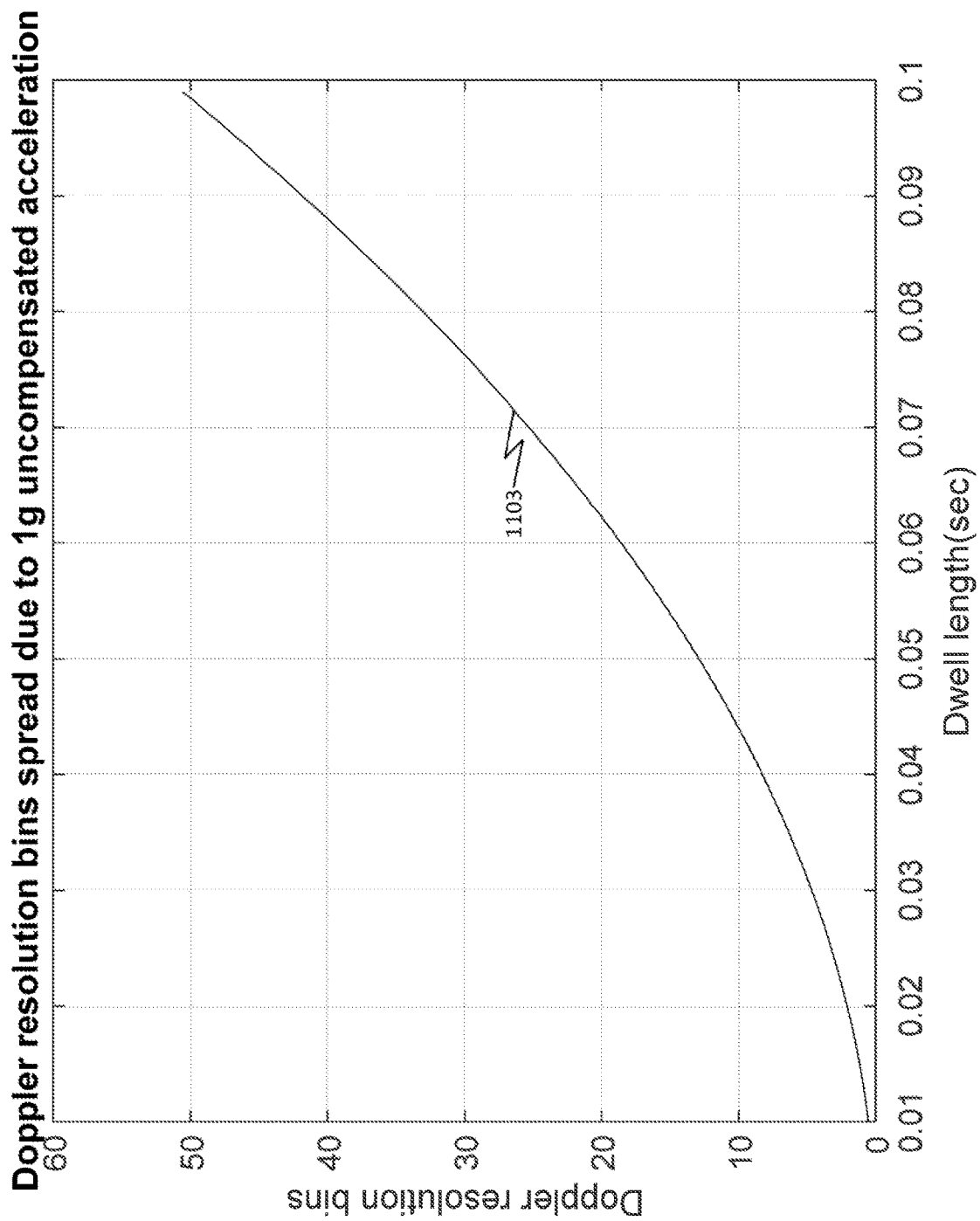
FIGS. 11A and 11B are charts illustrating the direct velocity measurement error and indirect acceleration measurement error induced by 1 g of uncompensated acceleration.
Figure 11B:
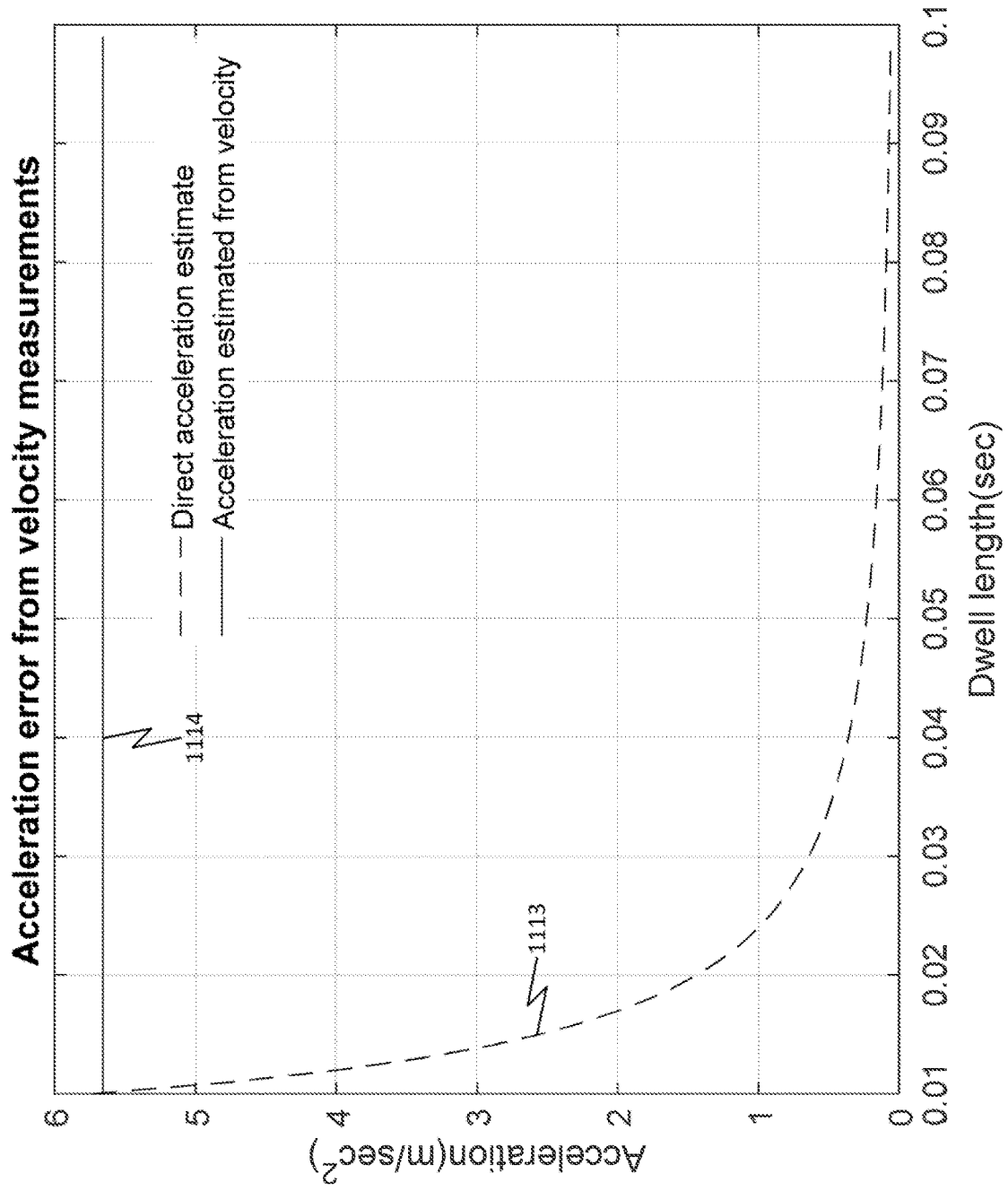

FIGS. 11A and 11B are charts illustrating the increased Doppler resolution bin spread, velocity measurement error, and indirect acceleration measurement error induced by 1 g of uncompensated acceleration. The figures also illustrate the increased error caused by longer dwell times. More precisely, line 1103 of FIG. 11A illustrates the increased Doppler resolution bin spread (and associated decreased velocity measurement accuracy) for increased dwell times induced by 1 g of uncompensated acceleration. Similarly, FIG. 11B illustrates two acceleration measurement errors for increased dwell times induced by 1 g of uncompensated acceleration. One line, line 1113, shows the associated error for direct measurement of acceleration and another line, line 1114, shows the associated error for indirect measurement of acceleration (specifically, from successive velocity measurements). Note that the direct measurement of acceleration has a much smaller error than the indirect measurement.

Figure 12A:
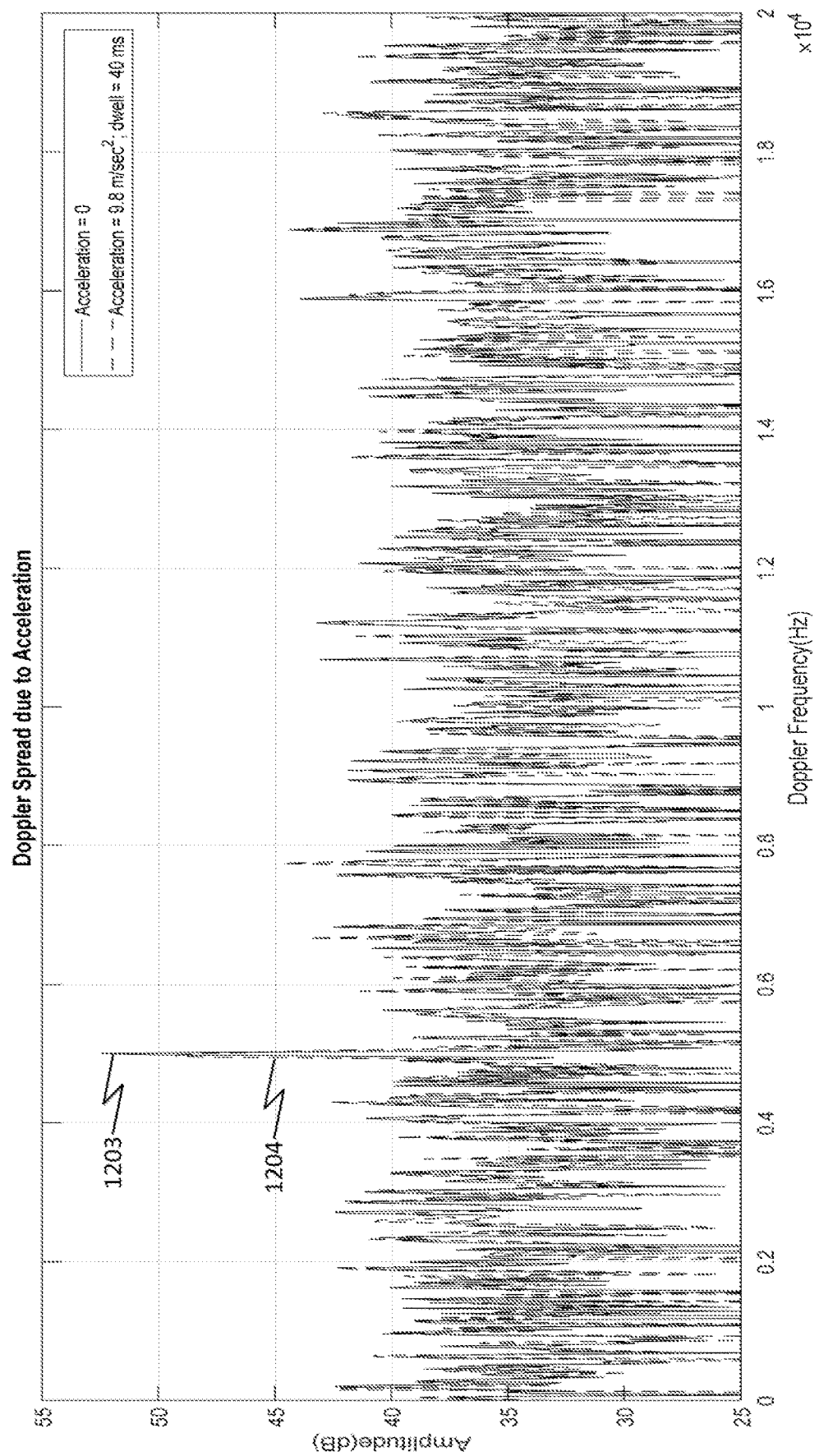
FIGS. 12A and 12B are charts illustrating the Doppler spread induced by 1 g of uncompensated acceleration and the associated decrease in signal-to-noise (SNR) ratio and velocity measurement accuracy.
Figure 12B:
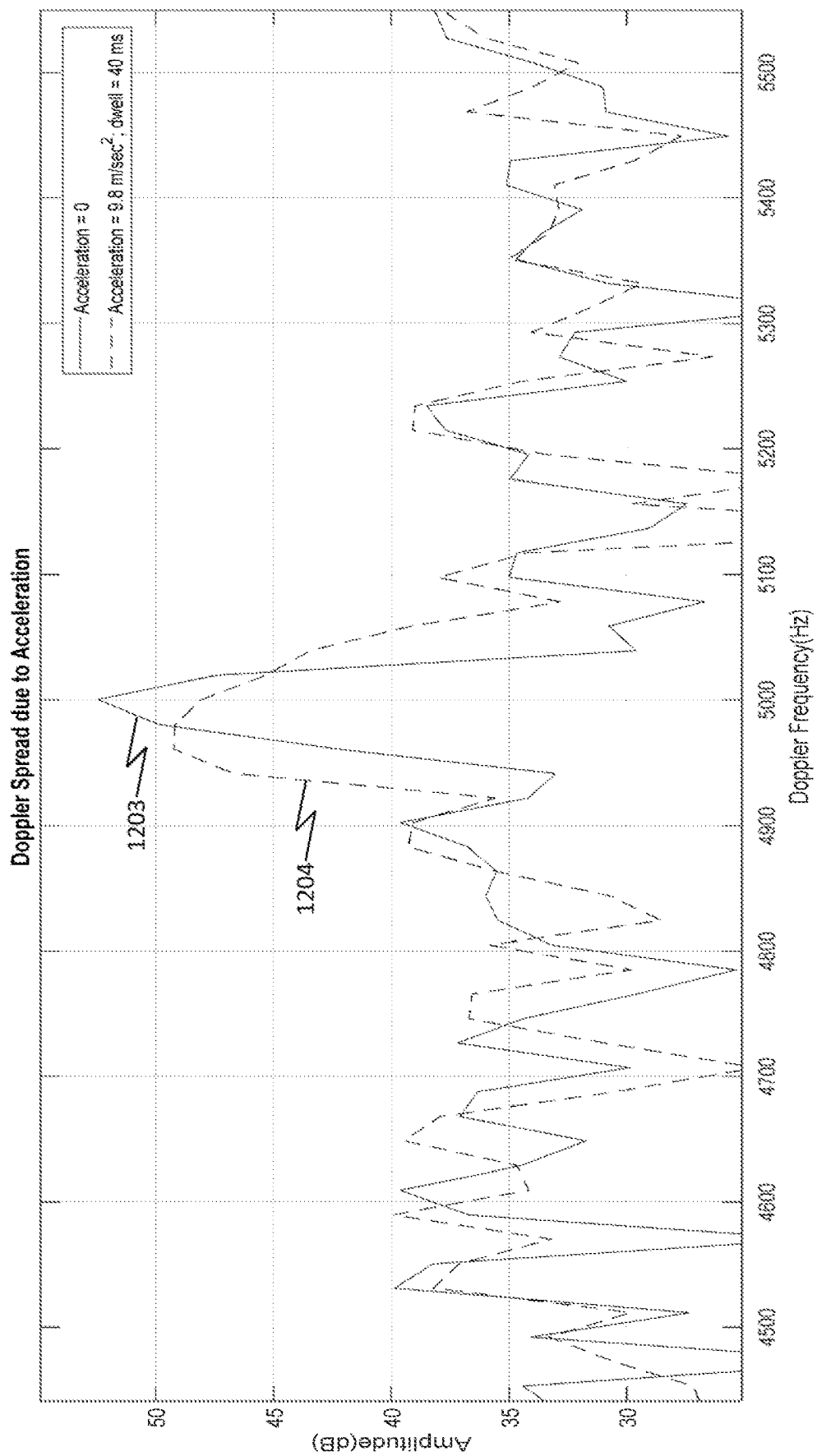

FIGS. 12A and 12B are charts illustrating the Doppler spread (i.e., the relative amplitude given the Doppler frequency) induced by 1 g of uncompensated acceleration and the associated decrease in the signal-to-noise (SNR) ratio of the signal and corresponding decrease in velocity measurement accuracy. More precisely, FIG. 12A illustrates the Doppler frequency measurement of two return signals reflected off an object, one with acceleration (and associated Doppler spread) and one without acceleration. Specifically, one line, line 1203, shows the associated Doppler spread error in the absence of any acceleration and another line, line 1204, shows the associated Doppler spread error in the presence of acceleration (specifically, 1 g of acceleration). Note that, in both figures, the peak Doppler frequency (centered around 5,300 KHz) of line 1203 is sharper and narrower than that of line 1204. FIG. 12B illustrates a zoomed-in view of the portion of the radar returns from FIG. 12A containing the Doppler Frequency shift caused by the detected object. As with FIG. 12A, one line, line 1203, shows the associated Doppler spread error in the absence of any acceleration and another line, line 1204, shows the associated Doppler spread error in the presence of acceleration (specifically, 1 g of acceleration). Also note that here, as with FIG. 12A, the peak Doppler frequency (centered around 5,300 KHz) of line 1203 is sharper and narrower than that of line 1204.

On the other hand, the benefit of directly measuring a motion parameter from the reflected radar signal is a significantly higher accuracy and significantly lower amount of time needed to obtain the measurement. The downside is that direct measurements may require significantly more computational resources to calculate. The computation power needed also typically increases for direct measurements of higher order motion parameters.

In many modern day systems, particularly those involved in autonomous or semi-autonomous vehicles, both approaches are employed, with velocity being directly measured from a radar signal reflection and acceleration being indirectly measured using successive velocity measurements. This reduces the computational burden needed for direct calculation of acceleration and partially mitigates the increased error from indirect measurement (since velocity is directly measured and thus more accurate). At the typical distance, speed, and acceleration of a motor vehicle, this approach can provide information quickly enough and accurately enough to be useful in many circumstances.

However, the increased time taken to measure acceleration, the reduced accuracy of the acceleration measurement, and the potential reduced accuracy of the velocity measurement, still can have a significant impact on the performance of the system with regards to human safety and comfort. The increased time taken to measure the acceleration reduces the reaction time for collision avoidance (or mitigation), increasing the probability of a collision and increasing the likely speed at the time of collision. The larger error in the acceleration measurement can also lead to a higher occurrence of false negatives (further reducing the time available for collision avoidance or mitigation) and of false positives (causing the vehicle to react inappropriately, which could itself cause an accident). Similarly, the error in the velocity measurement (for sufficiently large acceleration) may also lead a higher occurrence of false negatives and false positives.

To better address these issues, embodiments of the present disclosure may process radar signals to directly measure the range, velocity, and acceleration of an object. Specifically, embodiments of the present disclosure may receive a plurality of samples of a radar signal from and process these signals using a Fourier transform to generate a second plurality of samples of the radar signal. The second plurality of samples of the radar signal may then be used to conduct a coarse search and generate an initial estimate of the object's range, velocity, and acceleration. The coarse search estimate of the object's motion parameters may then be used as the starting point for a fine search, which iteratively refines the coarse search estimate to generate a final value for the range, velocity, and acceleration of the object.

Figure 6:
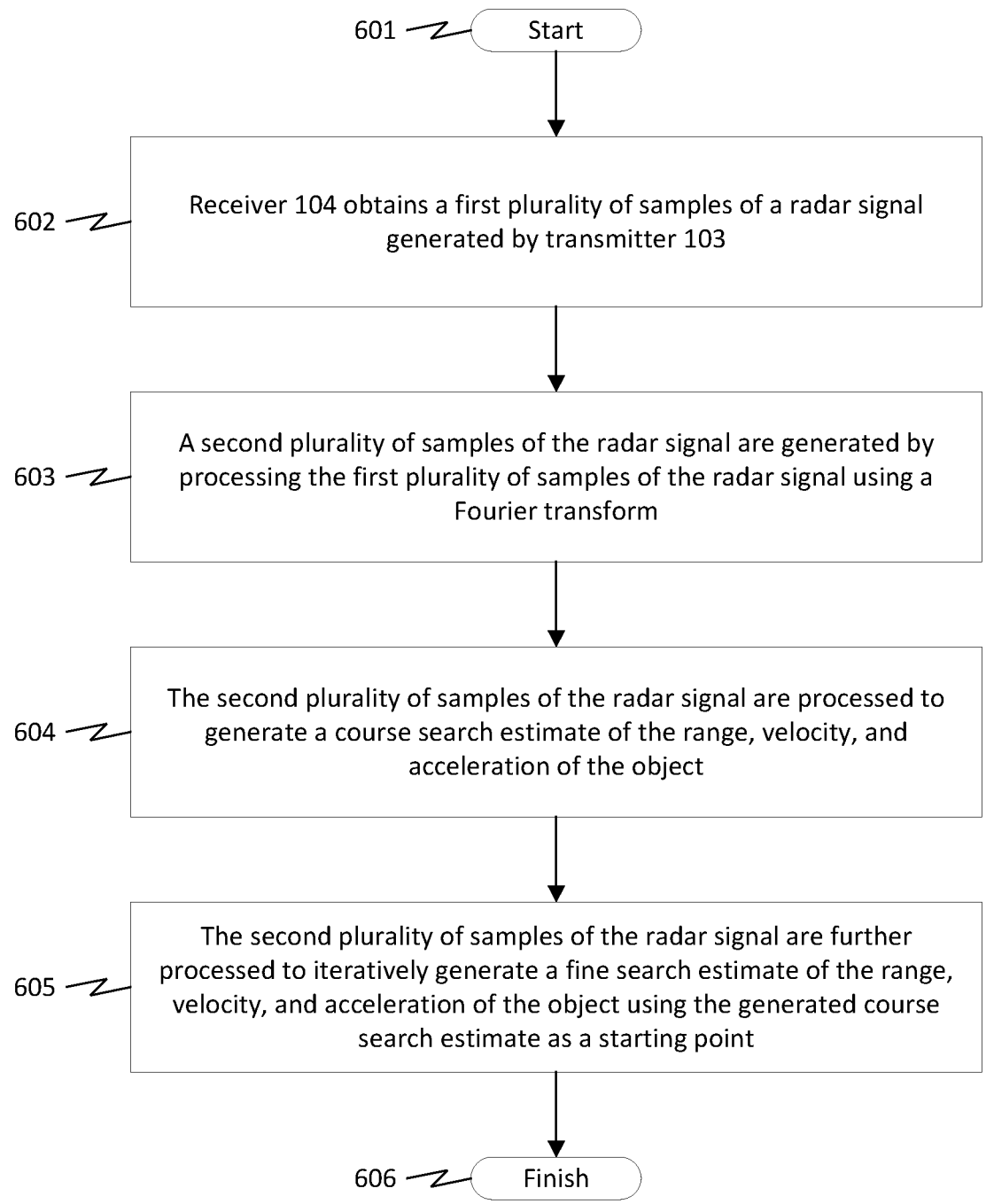
FIG. 6 is a flowchart of an exemplary method of processing radar signals, such as the radar signals of FIGS. 2 and 4, to estimate the range, velocity, and acceleration of an object.

FIG. 6 is a flowchart illustrating a process of processing radar signals as just described. To start, as shown by block 602 of FIG. 6, a receiver 104 obtains a plurality of samples of a radar signal generated by a transmitter 103. More precisely, the transmitter 103 may generate a signal which is broadcast by an antenna 106. This signal is composed of multiple, evenly spaced pulses, with the time between successive pulses referred to as the inter-pulse period (IPP). This signal (i.e., each pulse of the signal) propagates through free-space (e.g., the earth's atmosphere) for some distance, before encountering and reflecting off at least one object. This may occur at multiple distances and for multiple objects. When a pulse reflects from an object, some of the reflected pulse is directed towards the antenna 106. After traveling the distance back to the antenna 106, the pulse is received by the antenna 106 and directed to the receiver 104, which takes several samples (at a rate referred to as the sampling rate) of the reflected pulse. This process (ideally) occurs for every pulse comprising the radar signal.

After the receiver 104 obtains the first plurality of samples of the radar signal, the first plurality of signals are processed to obtain a second plurality of samples of the radar signal. Specifically, as shown by block 603 of FIG. 6, the first plurality of samples of the radar signal are processed using a Fourier transform to generate a corresponding second plurality of samples of the radar signal.

After the second plurality of radar samples are generated, the second plurality of radar samples are processed to generate an initial estimate of the object's motion parameters. Specifically, as shown by block 604 of FIG. 6, the second plurality of samples of the radar signal are processed to generate a coarse search estimate of the object's range, velocity, and acceleration. The purpose of the coarse search estimate is to obtain initial estimated values for the object's range, velocity, and acceleration that is "close" to the true values for the object's range, velocity, and acceleration. Here, in this context "close" means that the difference between the estimated value and the true value is such that, when the initial value is revised as described below, there is some guarantee (possibly a probabilistic guarantee) the changes to the estimated value converge to the true value. These bounds may change depending on the algorithm used to refine the coarse search estimate and the overall signal-to-noise ratio (SNR) of the first plurality of samples of the radar signal.

After the coarse search estimate is determined, the coarse search estimate may be used to generate a fine search estimate. Specifically, as shown by block 605 of FIG. 6, the second plurality of samples of the radar signal are further processed to iteratively generate a fine search estimate of the object's range, velocity, and acceleration using the coarse search estimate as a starting point. In other words, a fine search estimate is initialized to the value of the coarse search estimate and is then incrementally updated so that it is closer to the true value of the object's motion parameters. This process is repeated on the then current fine search estimate for some number of iterations. After the final iteration, the fine search estimate will be within a (ideally, very small) percentage of the true value of the object's motion parameters. The fine search estimate after the final iteration (and final update) may then be used as the actual motion parameters of the object for further processing or decision-making.

Figure 7:
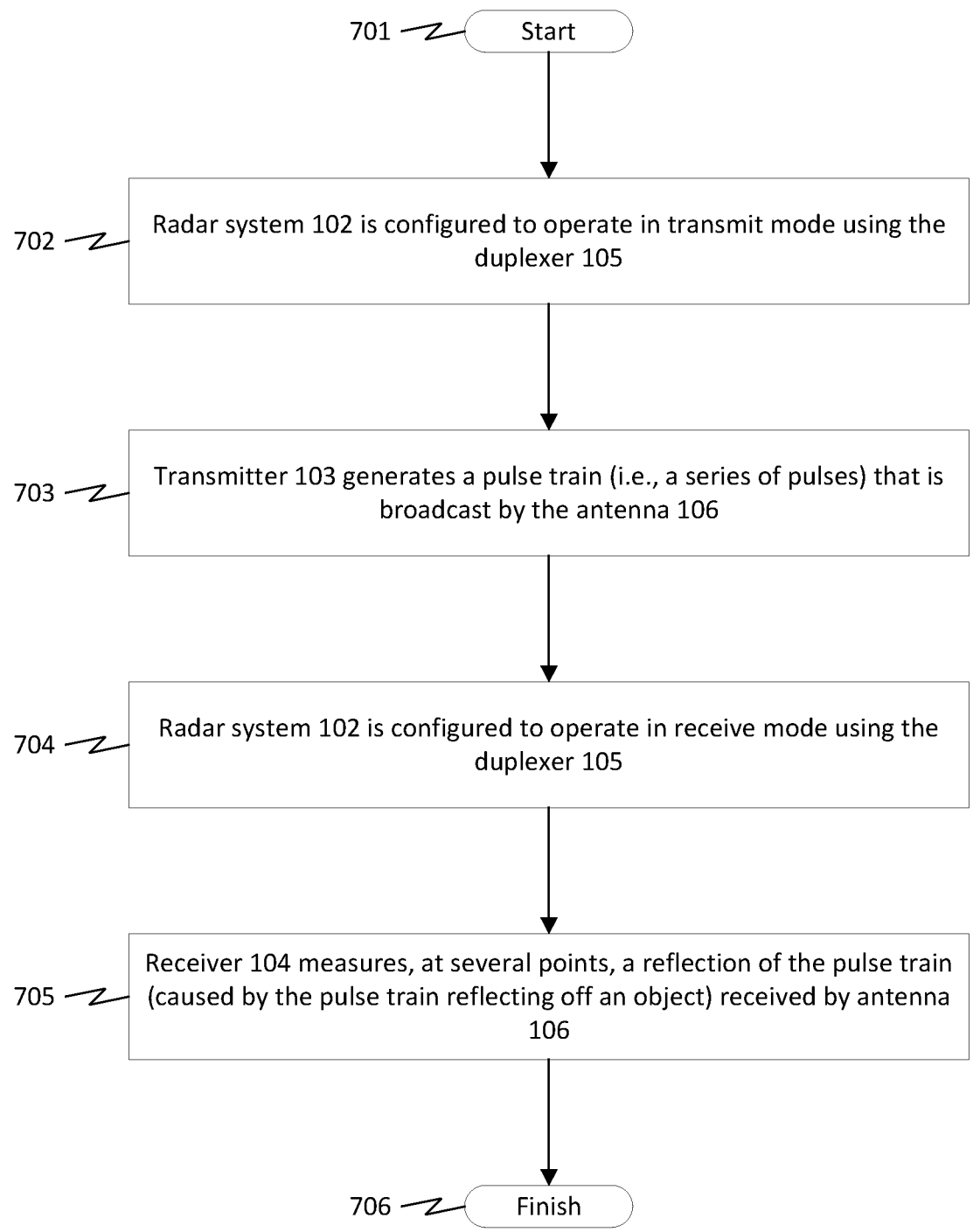
FIG. 7 is a flowchart of an exemplary method of generating a radar signal and measuring its reflection from an object.

FIG. 7 is a flowchart illustrating an exemplary process of generating a radar signal and measuring its reflection from an object, as mentioned above in block 602 of FIG. 6. To start, as shown by block 702 of FIG. 7, the radar system 102 is configured to operate in a transmit mode using the duplexer 105. This step is used because, in the exemplary radar system 102, the transmitter 103 and the receiver 104 share an antenna (the antenna 106). Thus, the radar system 102 cannot transmit while receiving (e.g., listening for reflections of a transmitted radar signal) and vice-versa. In other radar systems, the transmitter 103 and the receiver 104 may not share an antenna (e.g., may each have a dedicated antenna) and thus, in these radar systems, the transmitter may transmit simultaneously with the receiver receiving. An example of such a radar system is a multiple-input multiple-output (MIMO) radar system.

When the radar system is operating in the transmit mode, as shown by block 703 of FIG. 7, the transmitter 103 generates a pulse train that is broadcast by the antenna 106. The pulse train comprises a series of pulses. The pulses are generated at a constant rate, with the time between successive pulses known as the inter-pulse period (IPP). The waveform of each pulse is typically the same for all pulses in the pulse train. It may vary depending on the application. A particular suitable waveform is a linear frequency-modulated (LFM) waveform. An LFM waveform is a waveform where the frequency of the waveform, starting as an initial frequency, increases at a constant linear rate (known as the sweep rate) for the duration of the pulse. In the pulse train, the next pulse starts at the initial frequency.

After the pulse train is generated and broadcast, as shown by block 704 of FIG. 7, the radar system 102 is configured to transition from the transmit mode to a receive mode using the duplexer 105. Like was discussed for block 702, this step is used because, in the exemplary radar system 102, the transmitter 103 and the receiver 104 share an antenna (the antenna 106) and thus cannot be used simultaneously. In other radar systems, the transmitter 103 and the receiver 104 may not share an antenna (e.g., may each have a dedicated antenna) and thus, in these radar systems, the transmitter may transmit simultaneously with the receiver receiving. An example of such a radar system is gain a multiple-input multiple-output (MIMO) radar system.

When the radar system is operating in the receive mode, as shown by block 705 of FIG. 7, the receiver 104 takes several measurements of a reflection of the pulse train received by the antenna 106. In other words, at some point a pulse of the pulse train (i.e., the pulses, or some portion of them, that comprise the pulse train) encounters an object and is (at least partially) reflected. Some portion of this reflection is angled such that it is aimed back towards the radar system 102 (and, in particular, towards the antenna 106). This may occur for multiple objects. At any rate, eventually, the reflected pulses reach the antenna 106, interacting with the antenna and causing it to generate a corresponding electrical signal. This signal is then sent to the receiver 104 through the duplexer 105, which measures the electrical signal (and thus, indirectly, measures the reflected radar pulse).

More precisely, for each reflection of a radar signal pulse received by the antenna 106, the receiver 104 takes several measurements (called samples) of the pulse. Typically, the samples are taken at a constant rate known as the sampling rate. Ideally, the sampling rate is twice the frequency of the (highest frequency) of the reflected pulse to enable an error-free reconstruction of the pulse. This results in a plurality of samples of each reflected pulse. Since the pulse train is itself composed of a plurality of pulses, this results in a plurality of samples for each of the plurality of pulses (for each object generating a reflection).

Note that, theoretically, a reflection of the transmitted pulse train (i.e., the transmitted radar signal) may have reached the radar system 102 before it is configured to operate in the receive mode. In this case, the reflection is simply lost. As a consequence of this, there is essentially a dead zone from the start of the radar system 102 to some distance, with the distance being determined by the duration taken for the pulse train. In other words, the time the radar system 102 is in the transmit mode, rather than the receive mode. The opposite situation can also occur, where a reflection only reaches the radar system 102 after the system switches back to transmit mode for the next pulse train. In this case, the reflection is either also lost or, if even more time has passed and the system has again switched back to receive mode, interpreted as a reflection from the current pulse train. As a consequence of this, there is also essentially a dead zone starting some distance away from the radar system and essentially extending to infinity, with the starting distance being determined by the duration the radar system 102 is in the receive mode. This essentially defines the operational range of the radar system 102, from the end of the first dead zone to the start of the second dead zone.

As mentioned above, in some embodiments, the radar signal may be generated by MIMO radar system. Since a MIMO radar system effectively employs a large number of virtual antennas (which are essentially equivalent to a transmitter and receiver pair sharing an antenna, like the radar system 102 of FIG. 1), employing the radar signal processing method of FIG. 6 may require selecting one or more virtual antennas to employ the radar signal processing method on.

Specifically, the radar system may utilize a sparse 2D MIMO array comprised of a sparse transmitter array and a sparse receiver array. The sparse transmitter array may comprise a plurality of available transmitter elements (each comprised of a transmitter antenna and associated electronics). Similarly, the sparse receiver array may comprise a plurality of available receiver elements (each comprised of a receiver antenna and associated electronics). In operation, the 2D MIMO array works by having each of the available transmitter elements generate a sub-signal with a particular frequency and phase. The frequency and phase are chosen such that the sub-signals are mutually orthogonal and combine together to create a superimposed signal in the form of a plane wave travelling in a specific direction. The superimposed signal then reflects from an object back towards the sparse receiver array.

When the reflected signal arrives at the sparse receiver array, each of the plurality of available receiver elements measures the reflected radar signal. Because the reflected radar signal is composed of mutually orthogonal sub-signals, the measurements of the reflected radar signal by the available receiver elements can be processed to extract and identify (properties of) the sub-signals. These extracted signals can then be used to form a virtual array comprised of a number of virtual antennas (one for each combination of available transmitter element and available receiver element). Thus, after processing, at each virtual antenna is a plurality of sample of a radar signal equivalent to the radar signals generated by the radar system 102 of FIG. 1.

Once the virtual array is formed and the radar sub-signals associated with each virtual antenna are determined, the radar sub-signals may be evaluated by the method described in FIG. 6. For instance, if the rough position of an object is known, the radar sub-signals associated with each virtual antenna can be coherently combined (with respect to the particular object) to obtain a signal radar signal with a maximized SNR. This combined radar signal may then be evaluated by the method described in FIG. 6 to determine the motion parameters of the particular object. This process may be repeated for any other objects within the field of view of the virtual array.

As another example, if the rough position of an object is not known, a particular virtual antenna (or several virtual antennas) may be selected. The radar sub-signals associated with each selected virtual antenna (i.e., the plurality of samples of the radar signal) may be evaluated by the method described in FIG. 6. In other words, the radar signal samples from a virtual antenna can be selected to be processed to determine the motion parameter of an object within the view of the virtual antenna. In some cases, particular for sparse MIMO arrays, some virtual antennas may yield more accurate results than other virtual antennas. For example, in some cases a virtual antenna may have a better signal-to-noise ration with respect to a particular object than other virtual antennas. In this case, the virtual antenna with the better signal-to-noise ratio may be selected. This may differ if there are multiple objects, resulting in several virtual antennas being selected (and having their associated plurality of samples of their respective radar signal processed) by the method described in FIG. 6 to determine the motion parameters for these objects.

Figure 8:
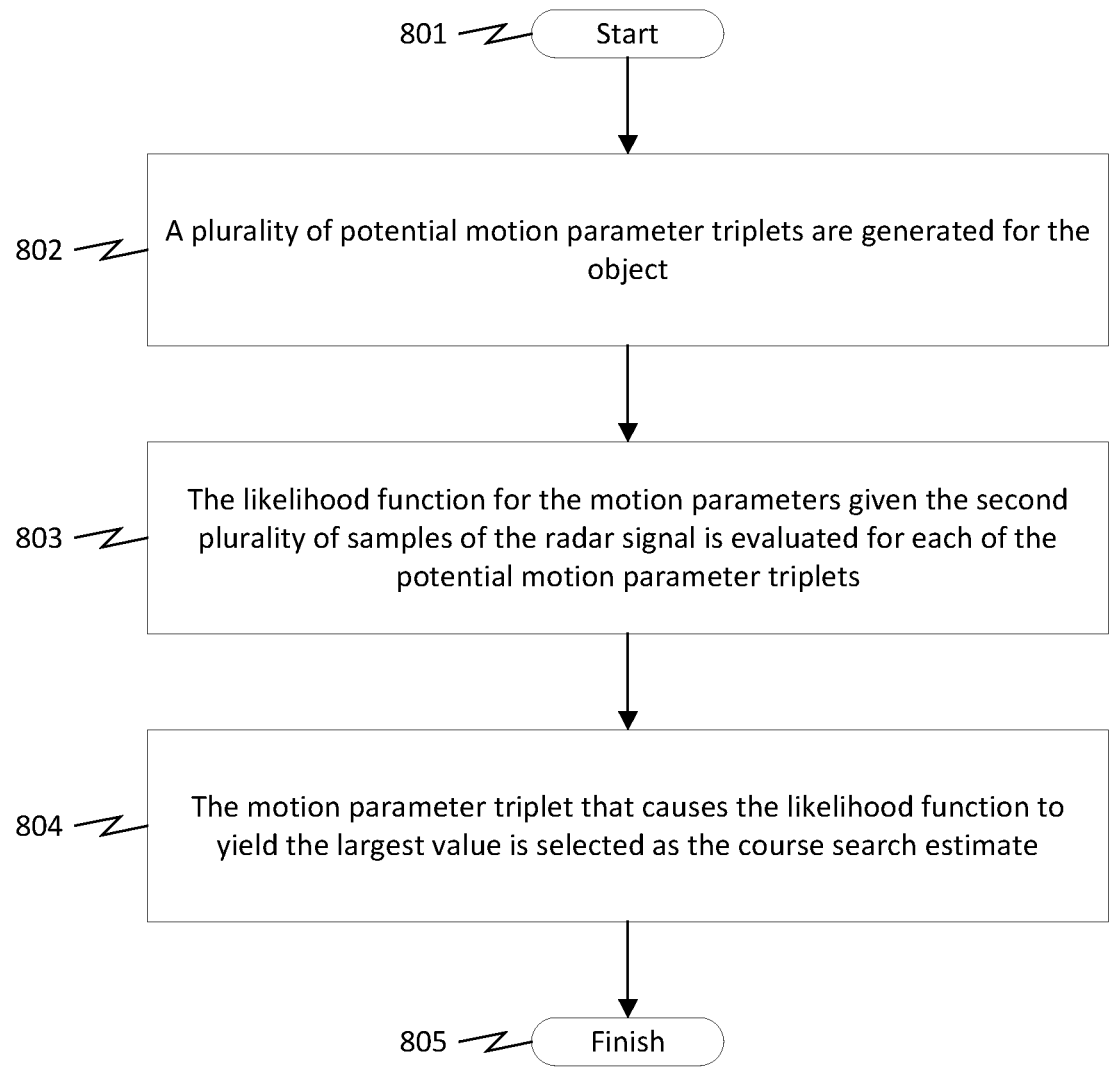
FIG. 8 is a flowchart of an exemplary method of generating a course search estimate of an object's motion parameters.

FIG. 8 is a flowchart illustrating an exemplary process of processing the second plurality of samples of the radar signal to generate a coarse search estimate of the object's range (in the form of seconds (e.g., time of flight)), velocity, and acceleration, as mentioned in block 604 of FIG. 6. To start, as shown by block 802 of FIG. 8, a plurality of potential motion parameters triplets (e.g., a vector ($\tau_n$, $v_n$, $\alpha_n$) whose values correspond to range, velocity, and acceleration) are generated for the object. The purpose of the motion parameter triplets is to "survey" point in the state space (i.e., the space of all possible combinations of motion parameters an object may have) to find a point sufficiently close to the true value of the object's motion parameters.

Since there are a potentially infinite number of motion parameter triplets that could be generated, some criteria is used to select which motion parameter triplets to be generated. Ideally, the motion parameter triplets are selected such that, if the true value is closest to a particular motion parameter triplet, then that motion parameter triplet is sufficiently close to the true value of the object's parameters to converge to the true value when the estimate is refined and will (with some, preferably high, probability) be selected as the coarse search estimate. The motion parameter triplets are also ideally selected such that the true value will (with some, preferably high, probability) always be sufficiently close to one of the potential motion parameter triplets.

One such method to select which potential motion parameter triplets to generate is to generate a grid of vertex points in the motion parameter state space with a spacing such that, for any chosen point on the grid closest to one of the vertex points, the vertex point is sufficiently close to the chosen point to ensure convergence. The vertex points can then be selected as the potential motion parameter triplets. This, however, still leaves an (effectively) infinite number of potential motion parameter triplets, since the upper bounds on range, velocity, and acceleration are extremely large (e.g., the size of the observable universe, Planck acceleration). Fortunately, practical knowledge can be used to determine, for a given application, the maximum and minimum values for range, velocity, and acceleration that an observed object would ever (in a practical sense) possess. These values can then be used to constrain the range, velocity, and acceleration to preset intervals.

When the method used to refine the initial coarse search estimate is a variant of Newton's method (such as is described below in FIG. 9), the chosen grid of vertex points may be spaced such that any point closest two one of the vertex points (including points that are equally close to another vertex point, so long as no other vertex point is strictly closer) is within the region of convergence guaranteed for Newton's method. As an equivalent way of describing this structure, a three-dimensional lattice comprised of parallelepipeds, where the vertex points correspond to the vertices of the parallelepipeds. The size and shape of these parallelepipeds may vary depending on various factors, particularly the SNR of the second plurality of samples of the radar signal, the bandwidth of the radar signal, the inter-pulse period (IPP) of the radar signal, the frequency step of the radar signal, the number of pulses, and the number of samples of each pulse (equivalently, the intra-pulse sampling interval), and the like.

For example, for moderate or better SNR (e.g., above 15 dB), one such parallelepiped can be defined by the equation $$\left\{ \pm \frac{1.51}{\pi} \frac{c}{2} \frac{1}{(2k+1)\Delta f}, \right.$$
$$\left. \pm \frac{1.51}{\pi} \frac{\lambda}{2} \frac{1}{(2N+1)IPP}, \pm 0.000249\lambda \left( \frac{81}{(2N+1)IPP} \right)^2 \right\},$$

which yields eight values (one for each of the eight combinations of ±), each corresponding to one of the vertices of the parallelepiped centered at the origin (i.e., $\langle 0, 0, 0 \rangle$). The lattice is then composed of linear combinations of these parallelepipeds. Specifically, the points on the lattice can be defined by the equation $$\left\{ x\left( \frac{1.51}{\pi} \frac{c}{2} \frac{1}{(2k+1)\Delta f} \right), \right.$$
$$\left. y\left( \frac{1.51}{\pi} \frac{\lambda}{2} \frac{1}{(2N+1)IPP} \right), z\left( 0.000249\lambda \left( \frac{81}{(2N+1)IPP} \right)^2 \right) \right\},$$

for $\forall x, y, z \in \mathbb{Z}$. This is the full, infinitely spanning lattice. When the values of the range, velocity, and acceleration are restricted to specific ranges, the allowed values of x, y, z are restricted to subsets of the integers, X, Y, and, Z (i.e., $(\forall x, y, z) [x \in X \wedge y \in Y \cup \wedge z \in Z]$), where $$X = \left\{ x \in \mathbb{Z} \,\middle|\, \text{Range}_{Min} \le x\left(\frac{1.51}{\pi} \frac{c}{2} \frac{1}{(2k+1)\Delta f}\right) \le \text{Range}_{Max} \right\},$$

$$Y = \left\{ y \in \mathbb{Z} \,\middle|\, \text{Velocity}_{Min} \le y\left(\frac{1.51}{\pi} \frac{\lambda}{2} \frac{1}{(2N+1)IPP}\right) \le \text{Velocity}_{Max} \right\}, \text{ and}$$

$$Z = \Bigg\{ z \in \mathbb{Z} \,\bigg|\, \text{Acceleration}_{Min} \le$$
$$z\bigg(0.000249\lambda \left(\frac{81}{(2N+1)IPP}\right)^2\bigg) \le \text{Acceleration}_{Max} \Bigg\}.$$

Essentially, X, Y, and, Z are collections of the number of spacings (as defined by the equation) on can move on a given axis (i.e., range, velocity, or acceleration) while remaining with the intervals for range, velocity, and acceleration.

One example of how domain-knowledge can allow restricting the values of range, velocity and acceleration to certain intervals for specific applications is with regards to object detection for driver-assistance features in vehicles. For example, if the radar signals being processed are used in a driver-assistance system of a vehicle, the potential objects may be other vehicles, cars, obstacles on the road, etc. In either case, this system logically would only be concerned with a range very close to the car (e.g., around 1 meter) to a distance covering potential obstacles that the car may need to react to (e.g., 500 meters). The fastest of these objects and the quickest to accelerate of these objects defines the logical upper bound of the velocity and acceleration that may be encountered. In this case, the objects with the highest velocity and acceleration are other vehicles, which would be highly unlikely to have a velocity outside an interval between −120 m/s and 120 m/s (since velocity can be either positive or negative) or have an acceleration outside an interval between −30 m/s² and 30 m/s² (since acceleration can be either positive or negative). Thus, the intervals for range, velocity, and acceleration for a radar system deployed in this context could be 0 m≤range≤500, −120 m/s≤velocity≤120 m/s, and −30 m/s²≤acceleration≤30 m/s², respectively.

After the plurality of potential motion parameters triplets are generated, each of the potential motion parameter triplets are evaluated. Specifically, as shown by block 803 of FIG. 8, the value of the likelihood function for the motion parameters (given the second plurality of samples of the radar signal) is determined for each of the potential motion parameter triplets. In other words, the value of the likelihood function is evaluated at each of the vertices of the grid defined above. In general, the point at which the likelihood function obtains its maximum value (its global maximum) defines the single most likely point (give the second plurality of radar signals) for the true value of the object's motion parameters. Unfortunately, the likelihood function is not globally convex, yielding regions with various local maximums. These other maximums have the potential to cause ambiguity when evaluating selection potential motion parameter triplets. In other words, they have the possibility of causing a selected potential motion parameter to have a higher likelihood function value than another potential motion parameter, despite the second potential motion parameter being closer to the true value.

Fortunately, the convergence properties guaranteed by the grid discussed above also guarantee that the generated potential motion parameter triplet that has the highest likelihood function value also is the closest to the true value of the object's motion parameters. Thus, the likelihood function can be evaluated for each of the generated potential motion parameter triplets. These values can then be compared to one another to choose the generated potential motion parameter triplet to use as the coarse search estimate. Specifically, as shown by block 804 of FIG. 8, the motion parameter triplet that yields the highest maximum likelihood value is selected as the coarse search estimate.

Figure 9:
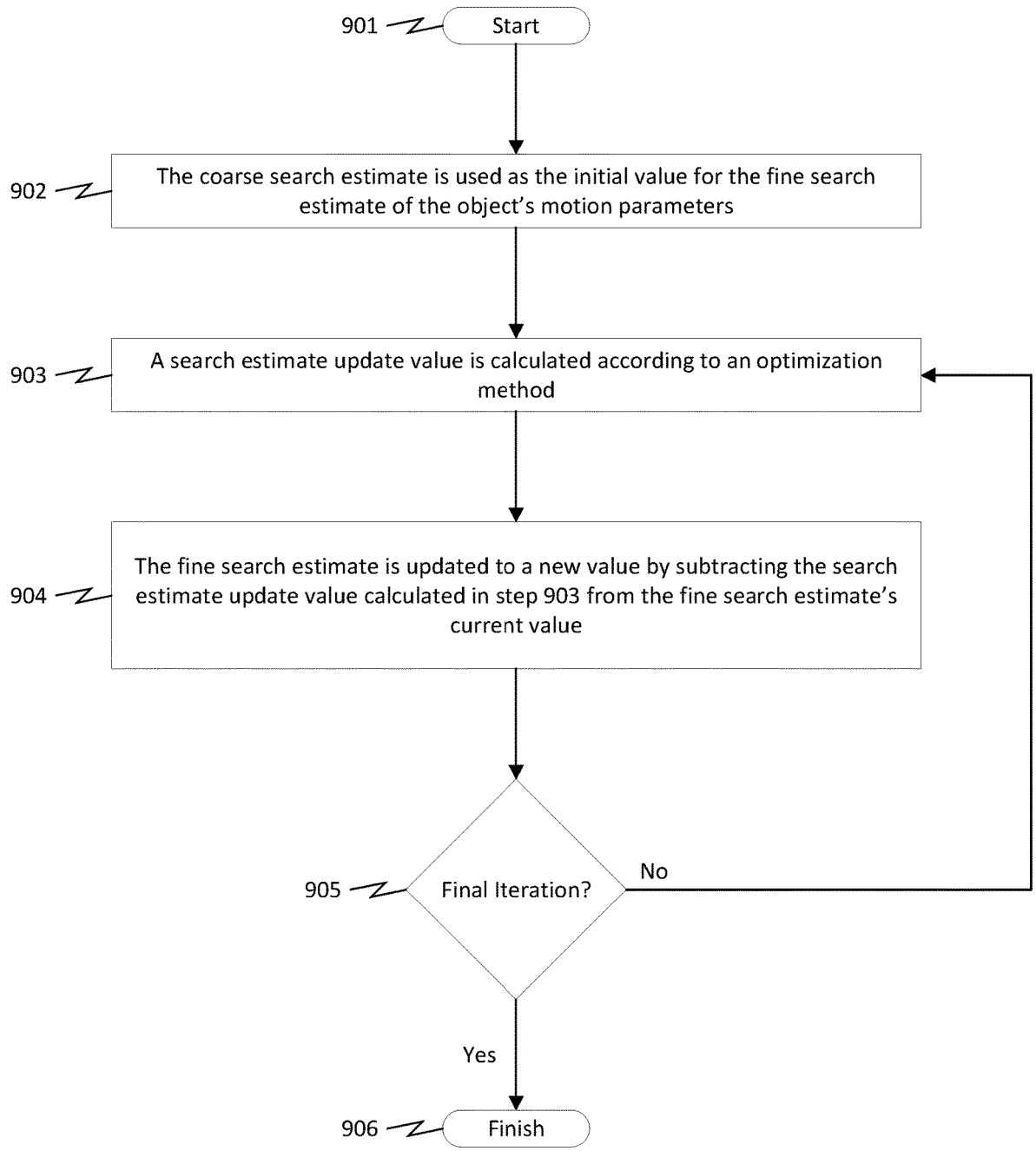
FIG. 9 is a flowchart of an exemplary method of generating a fine search estimate of an object's motion parameters by iteratively refining an initial estimate, such as the coarse search estimate of FIG. 8.

FIG. 9 is a flowchart illustrating an exemplary process of processing the second plurality of samples of the radar signal to iteratively generate a fine search estimate of the object's motion parameters using the coarse search estimate as a starting point, as mentioned in block 605 of FIG. 6. To start, as shown by block 902 of FIG. 9, the fine search estimate, before the first iteration, is set to the value of the coarse search estimate. Since the purpose of the fine search estimation process is to refine an estimate to be closer to the true value, a starting point is needed. The closer the starting point is to the true value, the faster and/or more accurate the result of the fine search estimation. Thus, since the closet known point to the true value is the coarse search estimate, the coarse search estimate is used as the starting point of the fine search estimation process.

After the current motion parameter is initialized to the coarse search estimate, an iterative process (i.e., steps 903 and 904 of FIG. 9) is repeated for a number of iterations, with each iteration updating the value of the current motion parameter such that it is closer to the true value of the object's motion parameters. To start the iterative process, as shown by block 903 of FIG. 9, a search estimate update value is calculated according to an optimization method. The purpose of the search estimate update value is to determine by what amount the components of the fine search estimate should be updated such that the fine search estimate is a closer approximation to the true value of the object's motion parameters. Since the "closeness" of the current fine search estimate to the true value of the object's motion parameters is being evaluated relative to the value of the likelihood function (i.e., to the value of the likelihood function, with larger indicating more "closeness"), this reduces to determining how the components of the fine search estimate should be updated to increase the value of the likelihood function.

After the search estimate update value is calculated, the fine search estimate is updated to a new value based on the search estimate update value. Specifically, as shown by block 904 of FIG. 9, the fine search estimate is updated to a new value by subtracting the search estimate update value calculated in block 903 from the current value of the fine search estimate.

After the fine search estimate is updated, it is determined if the set number of iterations has been completed. Specifically, as shown by block 905 of FIG. 9, at the end of the current iteration, it is determined if the set number of iterations has passed. If the set number of iterations has not passed, the process repeats at block 903. If the set number of iterations has passed, the fine search estimation process ends. The final value of the fine search estimate may then be used as the range, velocity, and acceleration values of the object in later processing.

Figure 10:
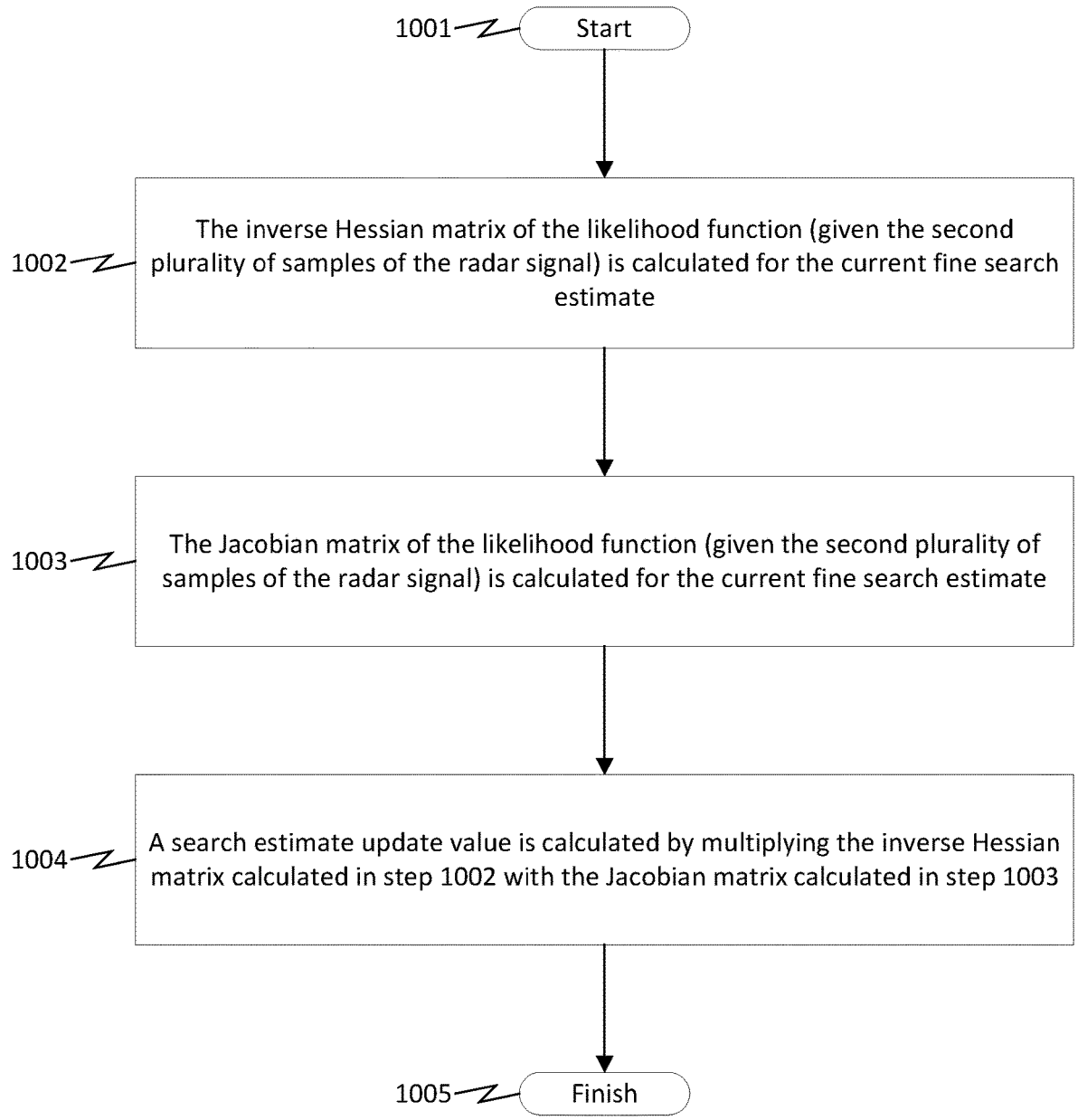
FIG. 10 is a flowchart of an exemplary method of calculating a search estimate update value using a variant of Newton's method.

FIG. 10 is a flowchart illustrating an exemplary process of calculating a search estimate update value using a variant of Newton's (optimization) method, as mentioned in block 903 of FIG. 9. As an overview, the process works by utilizing the derivatives of the likelihood function to find the nearest critical point (e.g., the local maximum) of the likelihood function. While the nearest critical point is not generally guaranteed to be the global maximum, if the starting point is within the area of convergence for Newton's method (it is "close" enough to the true value), then the nearest critical point is guaranteed to be the global maximum and each iteration of Newton's method is guaranteed to become incrementally closer to the true value.

To start, as shown by block 1002 of FIG. 10, the inverse Hessian matrix of the likelihood function for the motion parameters (given the second plurality of samples of the radar signal) is calculated for the current fine search estimate. In general, the Hessian matrix (also just called the Hessian) of a function is a square matrix containing the second-order partial derivatives of a function with respect to each combination of any two variables of the function. A second-order partial derivative can be thought of as the derivative (with respect to one variable of a function) of a first-order derivative of the function. Here, because the likelihood function is a function of three variables (i.e., range, velocity, and acceleration), the Hessian matrix would be a 3×3 matrix, whose nine entries correspond to the second-order partial derivatives with respect to (a combination of any two of) range, velocity, and acceleration. More precisely, the column of the Hessian matrix indicates the first variable (e.g., range, velocity, and acceleration) of a first-order derivative of the function, while the row indicates the variable of the derivate of that first-order function.

After the inverse Hessian matrix of the likelihood function is calculated, as shown by block 1003 of FIG. 10, the gradient of the likelihood function (given the second plurality of samples of the radar signal) is calculated for the current fine search estimate. In general, the gradient of a function is a matrix containing the first-order partial derivatives of the function with respect to each of the variables of the function. Here, because the likelihood function is a function of three variables (i.e., range, velocity, and acceleration), the gradient would be a 3×1 matrix, whose three entries correspond to the partial derivatives of the likelihood function with respect to each of the range, velocity, and acceleration.

After the gradient of the likelihood function is calculated for the current fine search estimate, the search estimate update value is calculated. Specifically, as shown by block 1004 of FIG. 10, the search estimate update value is calculated by multiplying the inverse Hessian matrix calculated in block 1002 with the gradient calculated in block 1003. Essentially, the multiplication of the inverse Hessian matrix with the gradient is essentially dividing the gradient by the Hessian matrix. The result of this operation is to find the direction which approaches the maximum value with the shortest route, taking into account curvature information of the likelihood function.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The devices, modules, and other functional units described in this disclosure can be implemented by hardware, or software, or a combination of hardware and software. One of ordinary skill in the art will also understand that the above described devices, modules, and other functions units may be combined or may be further divided into a plurality of sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

Now, therefore, the following is claimed:

1. A method for processing radar signals, comprising:
   obtaining a first plurality of samples of a radar signal, by:
      for each of a plurality of receiver antennas of a sparse multiple-input and multiple-output (MIMO) receiver array, collecting a plurality of samples of a radar signal, wherein the radar signal comprises a plurality of mutually orthogonal radar sub-signals that are each generated by one of a plurality of transmitter antennas of a sparse MIMO transmitter array;
   selecting a transmitter-receiver antenna pair by:
      determining, for each virtual antenna associated with a potential transmitter-receiver antenna pair, a signal-to-noise ratio associated with the virtual antenna relative to an object; and selecting the transmitter-receiver pair associated with the virtual antenna having the highest associated signal-to-noise ratio relative to the object; and generating the first plurality of samples of the radar signal by processing the plurality of samples of the virtual antenna corresponding to the selected transmitter-receiver antenna pair, wherein:

the radar signal comprises a plurality of radar signal pulses; and the first plurality of samples of the radar signal comprises a plurality of samples of each of the plurality of radar signal pulses; and processing the first plurality of samples of the radar signal to estimate a motion parameter of an object comprising values for a range, a velocity, and an acceleration of the object by:

generating a second plurality of samples of the radar signal by calculating the Fourier transforms of each of the plurality of radar signal pulses comprising the first plurality of samples of the radar signal;

processing the second plurality of samples of the radar signal to generate a coarse search estimate of the motion parameter of the object; and further processing the second plurality of samples of the radar signal to generate a fine search estimate of the motion parameter of the object using:

the coarse search estimate of the motion parameter of the object as a starting point.

2. The method of claim 1, wherein generating the coarse search estimate of the motion parameter of the object comprises:

generating a plurality of potential motion parameters of the object, wherein:

each of the plurality of potential motion parameters comprises potential values for the range, the velocity, and the acceleration of the object;

the potential values for the range, the velocity, and the acceleration are each within an allowed range interval, an allowed velocity interval, and an allowed acceleration interval, respectively; and the plurality of potential motion parameters are distributed such that at least one of the plurality of potential motion parameters is within a region of convergence of Newton's method for any combination of values within the allowed range, the allowed velocity, and the allowed acceleration intervals;

calculating a value of a likelihood function for each of the generated plurality of potential motion parameters, wherein the likelihood function is for the range, the velocity, and the acceleration of the object for the generated second plurality of samples of the radar signal; and selecting from the plurality of generated potential motion parameters a potential motion parameter that yielded a highest value of the likelihood function.

3. The method of claim 2, wherein generating the plurality of potential motion parameters of the object comprises:

determining, based on the second plurality of samples of the radar signal, a lattice comprised of parallelepipeds, wherein:

the vertices of each of the parallelepipeds correspond to a particular value for the range, the velocity, and the acceleration of the object; and the vertices of each of the parallelepipeds are spaced such that at any point within a parallelepiped, at least one of the vertices of that parallelepiped is within the region of convergence of the respective point; and enumerating the vertices of the parallelepipeds comprising the lattice whose values for range, velocity, and acceleration are within the allowed position range, the allowed velocity range, and the allowed acceleration range, respectively.

4. The method of claim 1, wherein:

the first plurality of samples of the radar signal corresponds to a radar system on a vehicle;

the fine search estimate of the motion parameter of the object is generated within 100 milliseconds of the radar signal being transmitted by the radar system; and the fine search estimate of the motion parameter of the object are within 10 percent of the true value of the motion parameter of the object.

5. A system for estimating a motion parameter of an object using a radar system, comprising:

a transmitter configured to generate and transmit a radar signal, wherein the transmitter comprises a sparse multiple-input and multiple-output (MIMO) transmitter array that comprises a plurality of transmitter antennas, wherein the radar signal includes mutually orthogonal radar sub-signals that are each generated by one of the plurality of transmitter antennas;

a receiver configured to obtain a first plurality of samples of reflections of the transmitted radar signal, and comprising a sparse MIMO receiver array that comprises a plurality of receiver antennas; and at least one processor configured to:

for each of the plurality of receiver antennas, collect the respective plurality of samples;

select a transmitter-receiver antenna pair by:

determining, for each virtual antenna associated with a potential transmitter-receiver antenna pair, a signal-to-noise ratio associated with the virtual antenna relative to an object; and selecting the transmitter-receiver pair associated with the virtual antenna having the highest associated signal-to-noise ratio relative to the object;

generate a first plurality of samples of reflections of the transmitted radar signal by processing the plurality of samples of the virtual antenna corresponding to the selected transmitter-receiver antenna pair;

generate a second plurality of samples of reflections of the transmitted radar signal by calculating the Fourier transforms of the first plurality of samples of reflections of the transmitted radar signal;

process the second plurality of samples to generate a coarse search estimate of the motion parameter of the object, wherein the motion parameter of the object comprises values for a range, a velocity, and an acceleration of the object; and further process the second plurality of samples to generate a fine search estimate of the range, the velocity, and the acceleration of the object using:

the coarse search estimate of the range, the velocity, and the acceleration of the object as a starting point.

6. The system of claim 5, wherein generating the coarse search estimate of the motion parameter of the object comprises:

generating a plurality of potential motion parameters of the object, wherein:

each of the plurality of potential motion parameters comprises potential values for the range, the velocity, and the acceleration of the object;

the potential values for the range, the velocity, and the acceleration are each within an allowed range interval, an allowed velocity interval, and an allowed acceleration interval, respectively; and the plurality of potential motion parameters are distributed such that at least one of the plurality of potential motion parameters is within a region of convergence of Newton's method for any combination of values within the allowed range, the allowed velocity, and the allowed acceleration intervals; and selecting a potential motion parameter from the plurality of motion parameters that yields a highest value for a likelihood function, wherein the likelihood function is for the range, the velocity, and the acceleration of the object for the generated second plurality of samples of reflections of the transmitted radar signal.

7. The system of claim 6, wherein generating the plurality of potential motion parameters of the object comprises:

determining, based on the second plurality of samples of reflections of the transmitted radar signal, a lattice comprised of parallelepipeds, wherein:

the vertices of each of the parallelepipeds correspond to a particular value for the range, the velocity, and the acceleration of the object; and the vertices of each of the parallelepipeds are spaced such that at any point within a parallelepiped, at least one of the vertices of that parallelepiped is within the region of convergence of the respective point; and enumerating the vertices of the parallelepipeds comprising the lattice whose values for range, velocity, and acceleration are within the allowed position range, the allowed velocity range, and the allowed acceleration range, respectively.

8. The system of claim 5, wherein:

the radar system is a component of a vehicle;

the transmitter and the receiver are a component of the radar system;

the fine search estimate of the motion parameter of the object is generated within 100 milliseconds of the radar signal being transmitted by the transmitter; and the fine search estimate of the motion parameter of the object are within 10 percent of the true value of the motion parameter of the object.

9. A non-transitory computer readable medium comprising instructions that, when executed by one or more processors, cause the one or more processors to process radar signals to estimate a motion parameter of an object by:

obtaining a first plurality of samples of a radar signal by:

for each of a plurality of receiver antennas of a sparse multiple-input and multiple-output (MIMO) receiver array, collecting a plurality of samples of a radar signal, wherein the radar signal comprises a plurality of mutually orthogonal radar sub-signals that are each generated by one of a plurality of transmitter antennas of a sparse MIMO transmitter array;

selecting a transmitter-receiver antenna pair by:

determining, for each virtual antenna associated with a potential transmitter-receiver antenna pair, a signal-to-noise ratio associated with the virtual antenna relative to an object; and selecting the transmitter-receiver pair associated with the virtual antenna having the highest associated signal-to-noise ratio relative to the object; and generating the first plurality of samples of the radar signal by processing the plurality of samples of the virtual antenna corresponding to the selected transmitter-receiver antenna pair, wherein:

generating a second plurality of samples of the radar signal by calculating the Fourier transforms of the first plurality of samples of the radar signal;

processing the second plurality of samples of the radar signal to generate a coarse search estimate of the motion parameter of the object, wherein the motion parameter of the object comprises values for a range, a velocity, and an acceleration of the object; and further processing the second plurality of samples of the radar signal to generate a fine search estimate of the range, the velocity, and the acceleration of the object using:

the coarse search estimate of the range, the velocity, and the acceleration of the object as a starting point.

10. The non-transitory computer readable medium of claim 9, wherein generating the coarse search estimate of the motion parameter of the object comprises:

generating a plurality of potential motion parameters of the object, wherein:

each of the plurality of potential motion parameters comprises potential values for the range, the velocity, and the acceleration of the object;

the potential values for the range, the velocity, and the acceleration are each within an allowed range interval, an allowed velocity interval, and an allowed acceleration interval, respectively; and the plurality of potential motion parameters are distributed such that at least one of the plurality of potential motion parameters is within a region of convergence of Newton's method for any combination of values within the allowed range, the allowed velocity, and the allowed acceleration intervals; and selecting a potential motion parameter from the plurality of motion parameters that yields a highest value for a likelihood function, wherein the likelihood function is for the range, the velocity, and the acceleration of the object for the generated second plurality of samples of the radar signal.

11. The non-transitory computer readable medium of claim 10, wherein generating the plurality of potential motion parameters of the object comprises:

determining, based on the second plurality of samples of the radar signal, a lattice comprised of parallelepipeds, wherein:

the vertices of each of the parallelepipeds correspond to a particular value for the range, the velocity, and the acceleration of the object; and the vertices of each of the parallelepipeds are spaced such that at any point within a parallelepiped, at least one of the vertices of that parallelepiped is within the region of convergence of the respective point; and enumerating the vertices of the parallelepipeds comprising the lattice whose values for range, velocity, and acceleration are within the allowed position range, allowed velocity range, and allowed acceleration range, respectively.

* * * * *